United States Patent
Burgess et al.

(10) Patent No.: US 10,186,158 B2
(45) Date of Patent: Jan. 22, 2019

(54) AUTOMATED AIR TRAFFIC COMMUNICATIONS

(71) Applicant: X Development LLC, Mountain View, CA (US)

(72) Inventors: James Burgess, Mountain View, CA (US); Chirath Thouppuarachchi, Redwood City, CA (US); Gregory Whiting, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/860,809

(22) Filed: Jan. 3, 2018

(65) Prior Publication Data

US 2018/0182251 A1    Jun. 28, 2018

Related U.S. Application Data

(63) Continuation of application No. 15/390,043, filed on Dec. 23, 2016, now Pat. No. 9,886,862.

(51) Int. Cl.
*G08G 5/00* (2006.01)
*G06F 3/16* (2006.01)
(Continued)

(52) U.S. Cl.
CPC ........... *G08G 5/0069* (2013.01); *G06F 3/167* (2013.01); *G07C 5/008* (2013.01); *G08G 5/0013* (2013.01);
(Continued)

(58) Field of Classification Search
CPC ..... G08G 5/0069; G08G 5/006; G08G 5/0021
(Continued)

(56) References Cited

U.S. PATENT DOCUMENTS 6,282,417 B1    8/2001    Ward
6,473,675 B2    10/2002    Sample
(Continued)

FOREIGN PATENT DOCUMENTS

WO    WO 2000/003366    1/2000
WO    WO 2015/102921    7/2015

OTHER PUBLICATIONS

International Search Report and Written Opinion issued in International Application No. PCT/US2017/064811, dated Mar. 30, 2018, 10 pages.
(Continued)

*Primary Examiner* — Kevin Kim
(74) *Attorney, Agent, or Firm* — Fish & Richardson P.C.

(57) ABSTRACT

Apparatus and methods related to aviation communications are included. A computing device can receive position data indicating a position of an aerial vehicle. The position can include an altitude. The computing device can determine, from a plurality of possible airspace classifications, a first airspace classification at the position of the aerial vehicle, where each airspace classification specifies one or more communication parameters for communication within an associated airspace. The computing device can select, from a plurality of communication repositories, a first communication repository that is associated with the first airspace classification, where each communication repository specifies a set of pre-defined communication components for at least one associated airspace classification. The computing device can generate a communication related to the aerial vehicle using the first communication repository. The computing device can send the generated communication to at least one recipient.

20 Claims, 11 Drawing Sheets

(51) Int. Cl.
| | |
|---|---|
| *G07C 5/00* | (2006.01) |
| *H04W 4/029* | (2018.01) |
| *H04B 7/185* | (2006.01) |
| *H04W 4/46* | (2018.01) |
| *H04W 4/40* | (2018.01) |

(52) U.S. Cl.
CPC ......... *G08G 5/0021* (2013.01); *G08G 5/0026* (2013.01); *G08G 5/0052* (2013.01); *H04B 7/18506* (2013.01); *H04W 4/029* (2018.02); *H04W 4/40* (2018.02); *H04W 4/46* (2018.02); *H04B 7/185* (2013.01)

(58) Field of Classification Search
USPC .................................................. 340/931, 970
See application file for complete search history.

(56) References Cited

U.S. PATENT DOCUMENTS

| | | | |
|---|---|---|---|
| 6,992,626 | B2 | 1/2006 | Smith |
| 7,359,709 | B2 | 4/2008 | McGuffin |
| 7,689,423 | B2 | 3/2010 | Bicego et al. |
| 8,751,061 | B2 | 6/2014 | Coulmeau et al. |
| 8,849,476 | B2 | 9/2014 | Coulmeau |
| 9,401,758 | B2 | 7/2016 | Bosworth |
| 2007/0288128 | A1 | 12/2007 | Komer et al. |
| 2008/0165183 | A1 | 7/2008 | Rassieur et al. |
| 2011/0161073 | A1 | 6/2011 | Lesher et al. |
| 2011/0245997 | A1 | 10/2011 | Marty et al. |
| 2014/0018979 | A1 | 1/2014 | Goossen et al. |
| 2015/0321758 | A1 | 11/2015 | Sarna |
| 2015/0362917 | A1 | 12/2015 | Wang et al. |
| 2016/0019732 | A1* | 1/2016 | Fournier ................ B64D 45/00 701/34.2 |
| 2016/0244161 | A1* | 8/2016 | McClure ............... B64C 39/024 |
| 2017/0069214 | A1 | 3/2017 | Dupray |

OTHER PUBLICATIONS

Class Alpha Airspace, available online at: http://www.cfinotebook.net/notebook/national-airspace-system/class-alpha-airspace [last visited Nov. 3, 2016].
Class Bravo Airspace, available online at: http://www.cfinotebook.net/notebook/national-airspace-system/class-bravo-airspace (last visited Nov. 3, 2016).
Class Charlie Airspace, available online at: http://www.cfinotebook.net/notebook/national-airspace-system/class-charlie-airspace (last visited Nov. 3, 2016).
Class Delta Airspace, available online at: http://www_cfinotebook.net/notebook/national-airspace-system/class-delta-airspace (last visited Nov. 3, 2016).
Class Echo Airspace, available online at: http://www_cfinotebook.net/notebook/national-airspace-system/class-echo-airspace (last visited Nov. 3, 2016).
Class Golf Airspace, available online at: http://www_cfinotebook.net/notebook/national-airspace-system/class-golf-airspace (last visited Nov. 3, 2016).

U.S. Department of Transportation: Federal Aviation Administration, "Traffic Advisory Practices at Airports Without Operating Control Towers", Advisory Circular, May 21, 1990, 8 pages.
U.S. Department of Transportation: Federal Aviation Administration, "Recommended Standard Traffic Patterns and Practices for Aeronautical Operations at Airports Without Operating Control Towers", Advisory Circular, Aug. 26, 1993, 12 pages.
U.S. Department of Transportation: Federal Aviation Administration, "Aeronautical Information Manual", May 26, 2016, 726 pages.
U.S. Department of Transportation: Federal Aviation Administration, "U.S. Airspace Classes at a Glance", Your Aviation Safety Website: http:/lwwwJaasafety_gov/, Feb. 2011.
U.S. Department of Transportation: Federal Aviation Administration, "Classes of Airspace: Types of Controlled airspace", available online at: https://www.faasafety.gov/gslac/ALC/course_content.aspx?cID=42&sID=505&preview=true (last visited Nov. 5, 2016).
U.S. Department of Transportation: Federal Aviation Administration, "Phases of Flight", available online at: https://www.faa.gov/nextgen/phaseoffligh/ (last visited Oct. 6, 2016).
U.S. Department of Transportation: Federal Aviation Administration, "Air Traffic Control", Dec. 10, 2015, 729 pages.
U.S. Department of Transportation: Federal Aviation Administration, Unmanned Aircraft Operations in the National Airspace System (NAS), Nov. 25, 2015, 18 pages.
AeroSavvy, "How Pilots Communicate in Other Countries", available online at: http://aerosavvy.com/how-pilots-communicate/ (last visited Sep. 29, 2016).
Los Angeles International Airport Airspace Overview, Appendix H, 14 CFR Part 150 Noise Exposure Map Report, May 2015, 16 pages.
Marcus, Ben, "Proposed FFA Small UAS Rule—What is Class B, C, D and E airspace?", available online at: https://medium.com/future-of-flight/proposed-faa-small-uas-rule-what-is-class-b-c-d-and-e-airspace-81e760a36dbl#.kndb956kp, Feb. 22, 2015.
Morgan, Tim, "What are pilots saying to air traffic controllers and what does it mean?", available online at: https://www.quora.com/What-are-pilots-saying-to-air-traffic-controllers-and-what-does-it-mean, May 28, 2014.
National Airspace System, available online at: http://www.cfinotebook.net/notebook/national-airspace-system/national-airspace-system (last visited Nov. 3, 2016).
Radio Communications, available online at: http://www.cfinotebook.net/notebook/air-traffic-control/radio=communications (last visited Nov. 3, 2016).
Rossier, Robert N., "Class B Basics: The ABCs of Class B Airspace", AVweb, available online at: http://www.avweb.com/news/avtraining/183284-1.html, Apr. 4, 1998.
Still, Russell, "Radio Communications in Class D Airspace", available online at: http://www.goldsealgroundschool.com/library/classd-radio14.pdf (last visited Mar. 15, 2017).
Todd, Scott C., "A Guide to Class Band C Operations", available online at: jttp://www.scottsasha.com/aviation/airspace/operations.html (last visited Oct. 31, 2016).
Todd, Scott C., "Radio Communications Handout", available online at: http://www.scottsasha.com/aviation/plans/commshandout.html (last visited Oct. 31, 2016).
Wikipedia, "Airspace class", available online at: https://en.wikipedia.org/wiki/Airspace_class (last visited Oct. 9, 2016.
Wikipedia, "National Airspace System", available online at: https://en.wikipedia.org/wiki/National_Airspace_system (last visited Oct. 6, 2016).

* cited by examiner

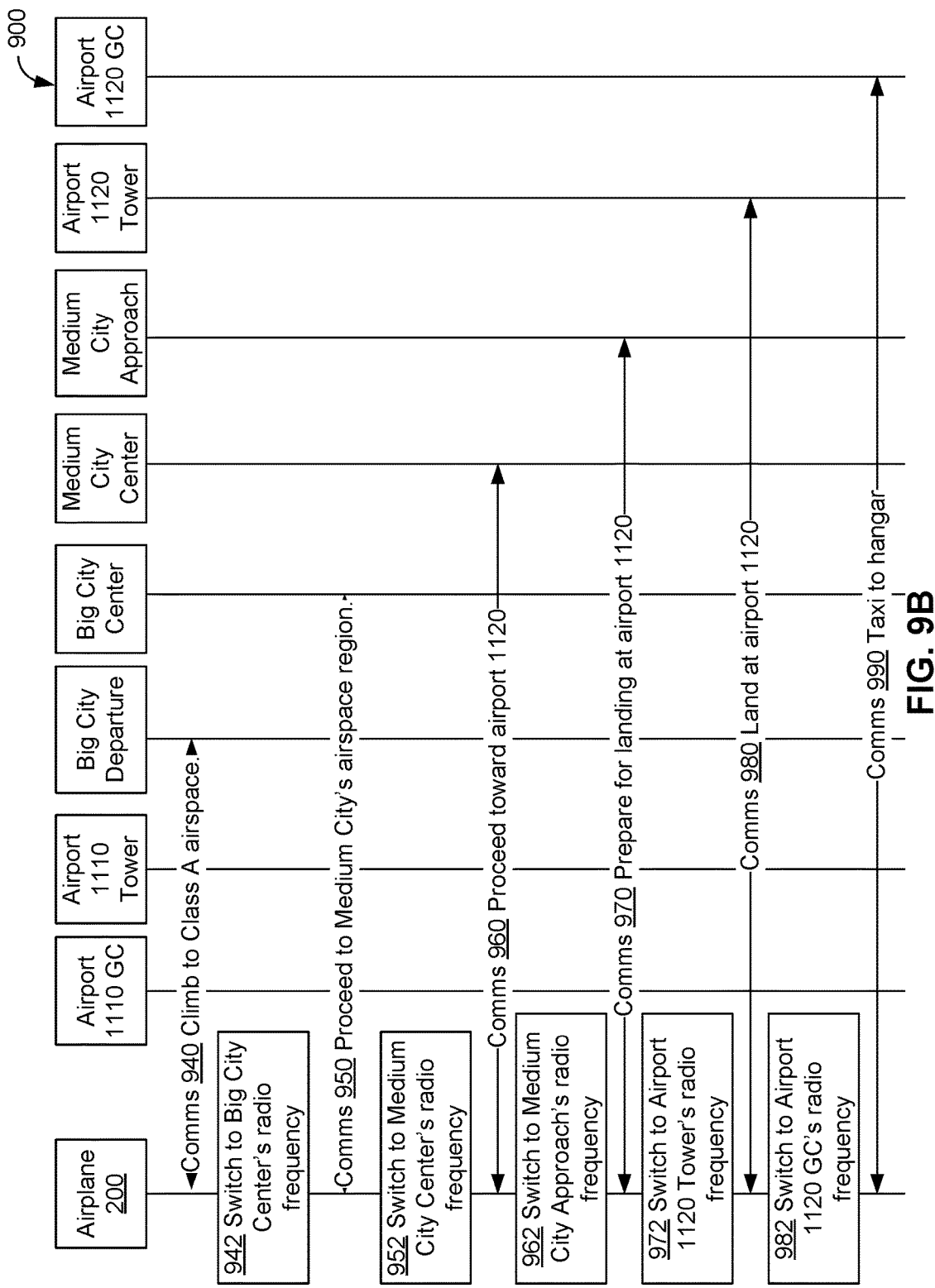

| Communication (Comm) Repository 1000 |
|---|
| Term 1002 |
| Word 1 |
| ... |
| Tag 1 |
| ... |
| Phrase 1 |
| ... |
| Template 1 |
| ... |

FIG. 10A

| Comm Repository 1010 | |
|---|---|
| Term 1012 | R/G 1014 |
| Word 1 | Recognition |
| ... | ... |
| Tag 1 | None |
| ... | ... |
| Phrase 1 | Generation |
| ... | ... |
| Template 1 | All |
| ... | ... |

FIG. 10B

| Comm Repository 1020 | |
|---|---|
| Term 1022 | Related Term 1024 |
| Word 1 | None |
| ... | ... |
| Tag 1 | Word 17 |
| ... | ... |
| Phrase 1 | Phrase 73 |
| ... | ... |
| Template 1 | Tag 42 |
| ... | ... |

FIG. 10C

| Comm Repository 1030 | |
|---|---|
| Term 1032 | Classes 1034 |
| Word 1 | Common |
| ... | ... |
| Tag 1 | B,C,D |
| ... | ... |
| Phrase 1 | A |
| ... | ... |
| Template 1 | G |
| ... | ... |

FIG. 10D

| Comm Repository 1040 | | | | |
|---|---|---|---|---|
| ID 1042 | Term 1044 | R/G 1046 | Classes 1048 | Related Term ID 1050 |
| 1 | Word 1 | Recognition | Common | none |
| ... | ... | ... | ... | ... |
| 135 | Tag 1 | None | G | 17 |
| ... | ... | ... | ... | ... |
| 767 | Phrase 1 | Generation | A | 840 |
| ... | ... | ... | ... | ... |
| 1929 | Template 1 | All | B,C,D | 177 |
| ... | ... | ... | ... | ... |

FIG. 10E

AUTOMATED AIR TRAFFIC COMMUNICATIONS

CROSS-REFERENCE TO RELATED APPLICATION

This application is a continuation of U.S. application Ser. No. 15/390,043, filed Dec. 23, 2016, the contents of which are incorporated by reference herein.

BACKGROUND

Autonomous and semi-autonomous vehicles can operate in different environments such as in the air, on the ground, underwater, and in space. Aerial autonomous vehicles may be referred to as unmanned aerial systems ("UASs") or unmanned aerial vehicles ("UAVs").

Various types of communication systems can be used by autonomous, semi-autonomous, and human-controlled aerial vehicles, and/or by ground-based or other non-aerial systems that communicate with aerial vehicles. In some cases, a UAS may have to communicate with manned aerial vehicles, related legacy support system entities (e.g., a manned air-traffic controller station), other UASs, and/or wholly or partially computer-automated air traffic control systems.

SUMMARY

Techniques and apparatus are provided for aviation communications. When an aircraft travels from point to point, the aircraft can be in communication with a number of different entities, including air traffic control entities that guide the aircraft while taking off, landing, and in flight, and ground control entities that guide the aircraft on land, such as while taxing to or from a runway. The aircraft can determine these communications based on an airspace related to the aircraft. The airspace can be divided into different classifications, such as classifications associated with airports, classifications associated with uncontrolled flight, and other classifications. The aircraft can determine an airspace classification based on position data. Then, the aircraft can use the airspace classification to select a communication repository that store data for generating communications based on the airspace classification and then generate communications with another entity, such as an air traffic control entity, another aircraft, or a ground control entity, using the selected communication repository.

In one aspect, a method is provided. A computing device receives position data indicating a position of an aerial vehicle, where the position includes an altitude. A first airspace classification at the position of the aerial vehicle is determined from a plurality of possible airspace classifications. Each airspace classification specifies one or more communication parameters for communication within an associated airspace. The computing device selects a first communication repository that is associated with the first airspace classification from a plurality of communication repositories. Each communication repository specifies a set of pre-defined communication components for at least one associated airspace classification. The computing device generates a communication related to the aerial vehicle using the first communication repository. The generated communication is sent to at least one recipient.

In another aspect, a computing device is provided. The computing device includes one or more processors; and data storage including at least computer-executable instructions stored thereon that, when executed by the one or more processors, cause the computing device to perform functions. The functions include: receiving position data indicating a position of an aerial vehicle, where the position includes an altitude; determining, from a plurality of possible airspace classifications, a first airspace classification at the position of the aerial vehicle, where each airspace classification specifies one or more communication parameters for communication within an associated airspace; selecting, from a plurality of communication repositories, a first communication repository that is associated with the first airspace classification, where each communication repository specifies a set of pre-defined communication components for at least one associated airspace classification; generating a communication related to the aerial vehicle using the first communication repository; and sending the generated communication to at least one recipient.

In another aspect, a non-transitory computer readable medium is provided. The non-transitory computer readable medium has stored thereon instructions, that when executed by one or more processors of a computing device, cause the computing device to perform functions. The functions include: receiving position data indicating a position of an aerial vehicle, where the position includes an altitude; determining, from a plurality of possible airspace classifications, a first airspace classification at the position of the aerial vehicle, where each airspace classification specifies one or more communication parameters for communication within an associated airspace; selecting, from a plurality of communication repositories, a first communication repository that is associated with the first airspace classification, where each communication repository specifies a set of pre-defined communication components for at least one associated airspace classification; generating a communication related to the aerial vehicle using the first communication repository; and sending the generated communication to at least one recipient.

In another aspect, a computing device is provided. The computing device includes: means for receiving position data indicating a position of an aerial vehicle, where the position includes an altitude; means for determining, from a plurality of possible airspace classifications, a first airspace classification at the position of the aerial vehicle, where each airspace classification specifies one or more communication parameters for communication within an associated airspace; means for selecting, from a plurality of communication repositories, a first communication repository that is associated with the first airspace classification, where each communication repository specifies a set of pre-defined communication components for at least one associated airspace classification; means for generating a communication related to the aerial vehicle using the first communication repository; and means for sending the generated communication to at least one recipient.

In another aspect, a system is provided: The system includes an aerial vehicle and a computing device. The aerial vehicle computing device is configured to perform aerial-vehicle functions. The aerial-vehicle functions include: sending position data indicating a position of the aerial vehicle, where the position includes an altitude. The computing device includes one or more processors and data storage including at least computer-executable instructions stored thereon that, when executed by the one or more processors, cause the computing device to perform computing-device functions. The computing-device functions include: receiving the position data indicating the position of the aerial vehicle, where the position includes the altitude;

determining, from a plurality of possible airspace classifications, a first airspace classification at the position of the aerial vehicle, where each airspace classification specifies one or more communication parameters for communication within an associated airspace; selecting, from a plurality of communication repositories, a first communication repository that is associated with the first airspace classification, where each communication repository specifies a set of pre-defined communication components for at least one associated airspace classification; generating a communication related to the aerial vehicle using the first communication repository; and sending the generated communication to at least one recipient.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 9A and 9B are a diagram illustrating a communication flow related to the scenario of FIG. 8 in accordance with an example embodiment.

FIGS. 10A-10E illustrate communication repositories, according to example embodiments.

DETAILED DESCRIPTION

I. Overview

Figure 1:
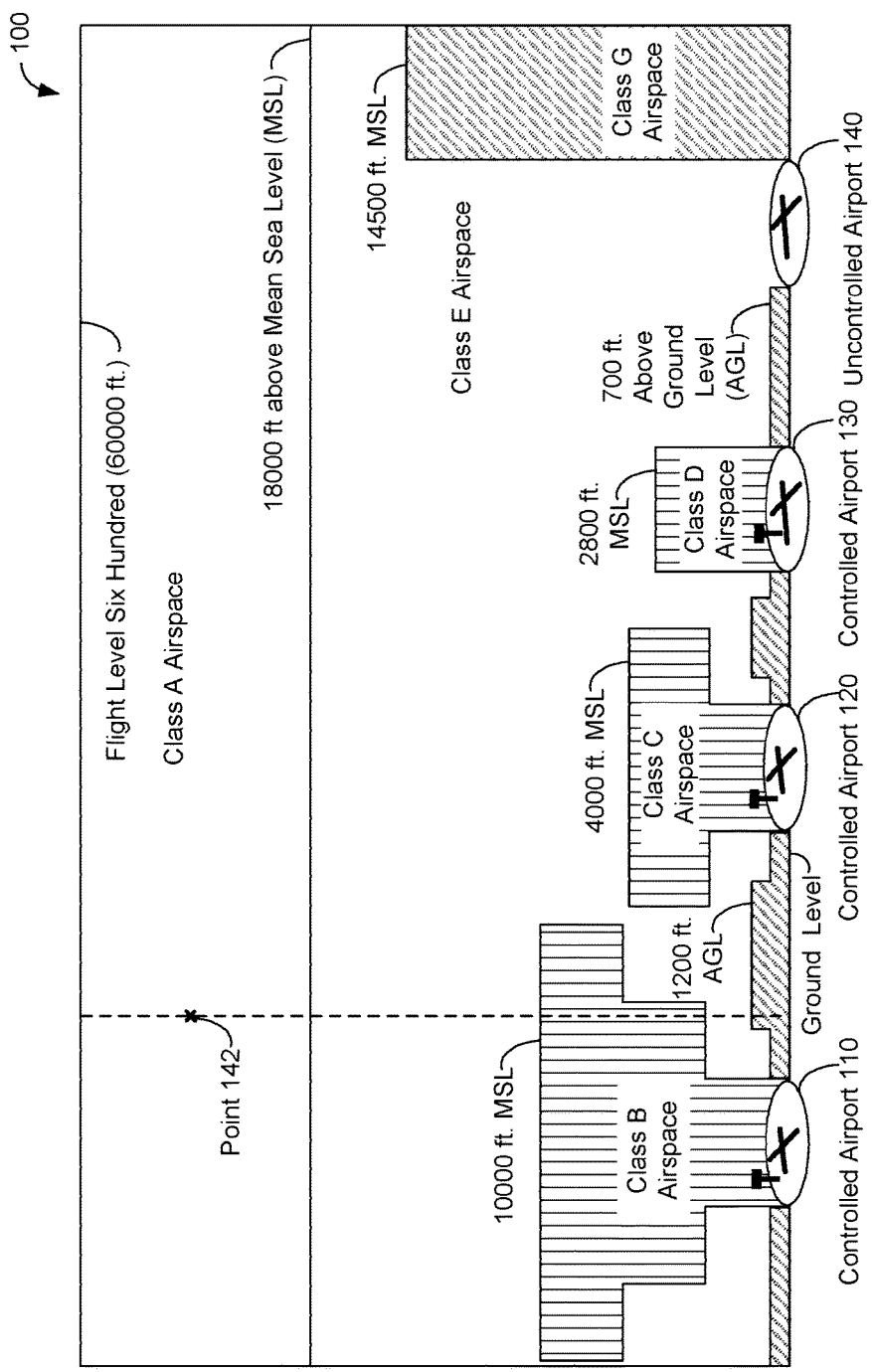
FIG. 1 is an illustration of airspace classifications, according to an example embodiment.

Disclosed herein are apparatus and techniques related to providing autonomous communications between aerial vehicles and air traffic control systems.

In many areas, including the United States, many three-dimensional airspaces are defined. Flight and/or communication parameters for these airspaces can be based on a number of pre-defined airspace classes, which can specify how an airspace can be used by commercial, governmental, and/or private aircraft, among other possibilities. For example, the United States identifies different types of airspace using six airspace classifications—classes A, B, C, D, E, and G. Each position in the airspace above the United States can be classified as being in one of these airspace classifications.

As a more specific example, classes B, C, and D are associated with airspaces surrounding controlled airports, and so these classes include communications related to various air traffic control entities, such as control towers, ground control for taxiing, departure control related to post-takeoff flight, and approach control related to pre-landing flight, that are not utilized in other airspaces. In contrast, airports in class G airspaces generally do not have control towers, and communications related to takeoffs and landings are broadcast to all nearby aerial vehicles rather than being directed to a control tower or other air traffic control (ATC) entity. As another example, class A airspace includes much of the airspace between 18,000 and 60,000 feet above the United States, which can be traversed using "jet routes" or pre-determined paths through class A airspace that act as highways in the sky—these jet routes are typically not used in other airspace classifications.

In a further aspect, a UAS and/or an automated air traffic control system can send and receive communications, including but not limited to voice communications, with other aerial vehicles, air traffic control entities, and perhaps other recipients. A computing device associated with the UAS or automated air traffic control system can recognize and generate these communications using speech generation and/or recognition software executing on the computing device.

In example embodiments, different communication repositories may be defined for different airspace classifications. As such, automated systems for communications with aerial vehicles can determine the particular airspace classification at an aerial vehicle's current position (e.g., current GPS coordinates and altitude), and use the communication repository for the particular airspace classification to generate communications and/or determine flight parameters for the aircraft.

For example, a class A communication repository can store language segments such as words, phrases, and/or templates related to flight communications related to a class A airspace. Similarly, class B, C, D, E, and G communication repositories can store words, phrases, and/or templates related to flight communications related to respective class B, class C, class D, class E, and class G airspaces. In some examples, a common repository can be used to store words, phrases, and/or templates, related to terminology used in multiple or all airspaces; e.g., store information about words, phrases, and/or templates, related to numbers, directions, military alphabet terminology, aircraft identifiers, etc. that can be communicated while in multiple or all airspaces.

It should be understood that "communication parameters," indicated by airspace classifications, specify how a communication in an associated airspace should be conducted. For example, communication parameters can define the types of entities to which an aircraft should send messages (e.g., to air traffic controllers or directly to other aerial vehicles), the communication protocols for encoding communications, etc. Communication parameters differ from "communication components," which are specified by a communication repository. Communication components are the building blocks that are used to form the substance of communications. In other words, communication parameters are provided by an airspace classification and specify how a message should be communicated in the airspace, while the communication components in an associated repository provide the content that makes up the substance of communications in an associated airspace.

In example embodiments, to determine which communication repository to use, an aerial vehicle or other device can determine a position associated with the aerial vehicle. The position can be determined in a three-dimensional (3D) coordinate system, such as a position specified in terms of latitude, longitude, and altitude, or in a two-dimensional (2D) coordinate system, such as a position specified in terms of latitude, longitude. Locations can be specified in terms of other 2D and/or 3D coordinate systems as well. The position associated with the aerial vehicle can be specified in position data that can include 2D and/or 3D coordinate data, including, but not limited to, data about latitude, longitude, and/or altitude.

Then, an airspace classification can be determined based on the position of the aerial vehicle, and one or more communication repositories can be selected based on the airspace classification. For example, if the aerial vehicle is flying 2,000 feet above O'Hare International Airport in Chicago, Ill., the aerial vehicle is flying in class B airspace. To generate and/or recognize communications for the aerial vehicle, the position of the aerial vehicle—2,000 feet above O'Hare—can determine an airspace classification—class B—for the aerial vehicle, and one or more communication repositories can be selected based on the airspace classification; e.g., a communication repository storing communication components related to communications with an aerial vehicles in class B airspaces, and perhaps a common communication repository storing communication components related to communications associated with multiple airspaces. Then, the selected one or more communication repositories can be used to generate and/or recognize communications while the aerial vehicle is in the class B airspace.

Storing communications based on airspace classifications can simplify speech generation and/or recognition. For example, once communication repositories of communications data are selected based on airspace classification, then the universe of possible communications data to generate and/or recognize has been limited from a universal set of communications data covering multiple topics of communication to a set of flight-related communications data tailored to an airspace environment of an aerial vehicle, as represented by the selected communication repositories of communications data. As the set of communications data represented by the selected communication repositories of communications data is smaller than the universal set of communications data, simplify speech generation and/or recognition using the selected communication repositories is simplified. This simplified speech generation and/or recognition can be faster and more accurate than speech generation and/or recognition relying on the universal set of communications data. And, faster and more accurate speech generation and/or recognition can enhance aerial vehicle safety and efficiency.

II. Airspace Classifications

FIG. 1 includes diagram 100 illustrating airspace classifications in an environment, according to an example embodiment. In many countries, including the United States, navigable airspace is divided based on airspace classifications. Diagram 100 shows an example division of a navigable airspace into airspace classifications that include class A airspace, class B airspace, class C airspace, class D airspace, class E airspace, and class G airspace.

An upper portion of diagram 100 indicates that class A airspace is a portion of the navigable airspace between 18,000 feet above mean sea level (MSL) and Flight Level Six Hundred, or 60,000 feet as indicated by an altimeter set to a standard barometric pressure; e.g., 29.92 inches of mercury. Diagram 100 illustrates class B airspace surrounds and includes controlled airport 110, where class B airspace has an upside-down ziggurat shape centered on controlled airport 110 that extends up to 10,000 above mean sea level. In other examples, class B airspace can be associated with one or more large, busy, and/or important controlled airports; e.g., Chicago-O'Hare International Airport in Chicago, Ill.

Diagram 100 illustrates class C airspace surrounding and including controlled airport 120, where class C airspace has a T-shape centered on controlled airport 120 that extends up to 4,000 above mean sea level. In other examples, class C airspace can be associated with one or more controlled airports that are smaller, less busy, and/or less important than airports associated with class B airspace; e.g., Chicago Midway International Airport in Chicago, Ill. Diagram 100 illustrates class D airspace surrounding and including controlled airport 130, where class D airspace has a rectangular shape centered on controlled airport 110 that extends up to 4,000 above mean sea level. In other examples, class D airspace can be associated with one or more controlled airports that are smaller, less busy, and/or less important than airports associated with class C airspace; e.g., Chicago/Aurora Municipal Airport in Sugar Grove, Ill.

Diagram 100 illustrates class G airspace ranging from ground level (GL), indicated by the bottom of diagram 100 to altitudes ranging between 700 feet above ground level (AGL), 1200 feet AGL, and 14,500 feet above mean sea level. A size of an airspace, such as class G airspace, can vary based on different conditions, such as weather, visibility, proximity to airports, etc. Diagram 100 illustrates that class E airspace includes any portion of navigable airspace not otherwise classified; e.g., class E is the default airspace classification. In some examples, class E airspace can extend above class A airspace; i.e., airspace above Flight Level Six Hundred. Other divisions of navigable airspaces into airspace classifications are possible as well.

Note that airspace classification can depend on both location and altitude (i.e., on position). For example, a line through point 142 from Flight Level Six Hundred to ground level is shown as a dotted line in FIG. 1 This dotted line goes through, from top to bottom: class A airspace, class E airspace, class B airspace, class E airspace, and class G airspace. Thus, a location corresponding to point 142, such as a location specified by latitude and longitude, can be classified as class A, class B, class E, or class G airspace depending on altitude.

In some examples, an airspace classification can be associated with one or more legally-defined airspace volumes. A legally-defined airspace volume can be a three-dimensional space specified by one or more local, regional, national, and/or international governments and/or governmental agencies. In some cases, non-governmental entities, such as industry associations and/or non-governmental organizations, can specify one or more legally-defined airspace volumes in accordance with existing law; e.g., a specification of airspace into one or more legally-defined airspace volumes can be proposed by a non-governmental entity and the specification can be ratified by an appropriate governmental entity. In some other cases, a legally-defined airspace volume can be specified in terms of a two dimensional area; e.g., a volume of airspace can be as being above a specified airport, county, country, state, city, an area defined by international law, or even an area defined by some more temporary measure (e.g., a "disaster area" or "no-fly zone" as defined by one or more governments), or other area. The legally-defined airspace volume can have one or more legally-defined airspace boundaries; e.g., boundaries specifying one or more two dimensional areas and altitude-based boundaries of airspaces such as illustrated by diagram 100.

III. Example Aircraft

Figure 2A:
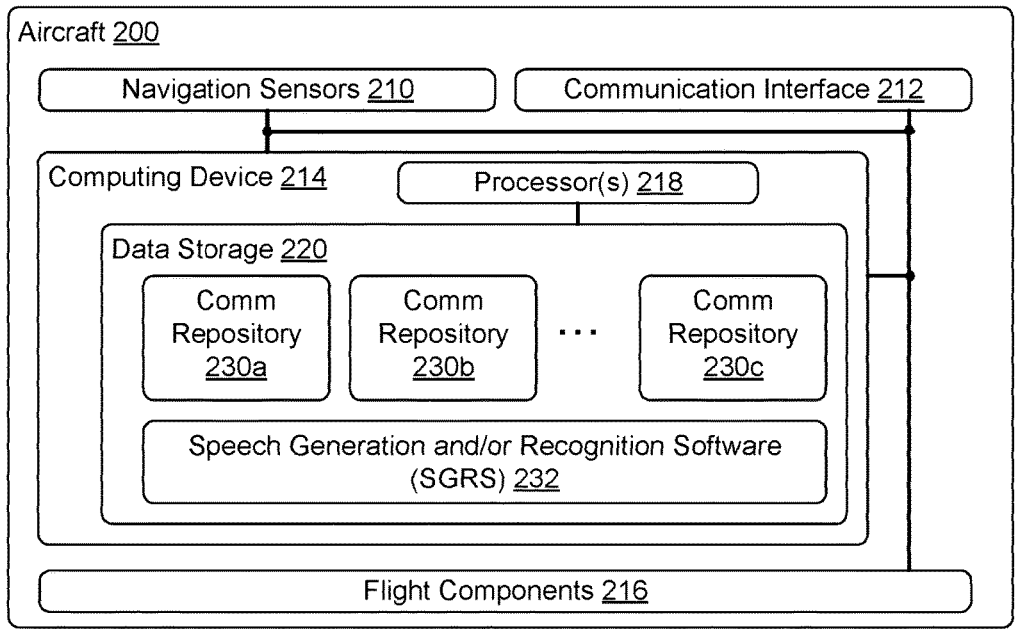
FIG. 2A is a block diagram of an aircraft, according to an example embodiment.

FIG. 2A is a block diagram of aircraft 200, according to an example embodiment. Aircraft 200 includes navigation sensors 210, communication interface 212, computing device 214, and flight components 216. Navigation sensors 210 can include avionics sensors, Global Positioning System (GPS) sensors including Wide Area Augmentation System (WAAS) GPS sensors, GLONASS devices, Very-High Frequency (VHF) Omnidirectional Range (VOR) radio navigation devices, compasses, and other devices suitable for aiding aircraft navigation. Communication interface 212 can include one or more: tunable radios suitable for aircraft communications, aviation radios, VHF radios, navigation (NAV) radios, communications (COM) radios, VOR radios, instrument landing system (ILS), and glide slope (GS) radios, transponders (e.g., a device that, upon reception of a radar or other input, produces a response, such as a response that includes a "squawk code" identifying aircraft 200, altitude information, and perhaps other data associated with aircraft 200), wireless communication interfaces, and wired communication interfaces. Flight components 216 include one or more components that enable aircraft 200 to enable and control its flight, including but not limited to, one or more aircraft engines, wings, winglets, ailerons, rudders, flaps, wheels, fuselages, jets, propellers, stabilizers, spoilers, elevators, and cockpits.

Computing device 214 includes one or more processors 218 and data storage 220. Processor(s) 218 can be one or more computer processors such as computer processors 403 discussed herein in the context of FIG. 4A. Data storage 220 can include one or more computer-readable storage media, such as data storage 404 discussed herein in the context of FIG. 4A. As shown in FIG. 2A, data storage 220 can store one or more communication repositories 230a, 230b, 230c, and speech generation and/or recognition software 232. In some examples, one or more of communication repositories 230a, 230b, 230c can be formatted as communication repository 1000, communication repository 1010, communication repository 1020, communication repository 1030, and/or communication repository 1040 discussed herein in the context of FIGS. 10A-10E.

Speech generation and/or recognition software 232 can, when executed by processor(s) 218, perform a set of functions. The set of functions can include: receiving position data from navigation sensors 210 or perhaps other sources, where the position data can indicate a location and altitude of aircraft 200 within an airspace that is classified according to a plurality of airspace classifications, where each airspace classification can be associated with one or more communication components for flight within the airspace; determining an airspace classification associated at least with an altitude of aircraft 200 indicated by the position data for the aerial vehicle; selecting a communication repository, such as communication repository 230a, of communication data from among communication repositories 230a, 230b, 230c based at least on the airspace classification, where at least communication repository 230a can provide pre-defined communication components for at least the first airspace classification; generating a communication related to aircraft 200 using the selected communication repository (e.g., communication repository 230a), and sending the communication related to aircraft 200 to at least one recipient via communications interface 212.

The recipients of the communication can include an airspace-related entity. An airspace-related entity can be an entity associated with travel that is related to one or more airspaces; e.g., an entity involved with flight, flight control, and/or ground control in one or more airspaces. Some example airspace-related entities include, but are not not limited to, one or more: air traffic control entities associated with an airport classified as being in class B, C, D, or G airspace, one or more ground control entities associated with the airport, other air traffic control and/or ground entities associated with one or more airspace classifications, aircraft flying in or otherwise associated with one or more airspace classifications, other air traffic control entities, and other ground control entities. Then, the selected repository can be selected based on an airspace classification and the airspace-related entity; and, in some examples, the generated communication can include a communication to the airspace-related entity. A similar set of functions can include recognizing a received communication using the selected communication repository, which can include a received communication from an airspace-related entity such as discussed immediately above. Then, the generated communication can include a response to the received communication. The generated communication and/or the response can include a voice communication, a data communication, or a combination of voice and data communications.

Figure 2B:
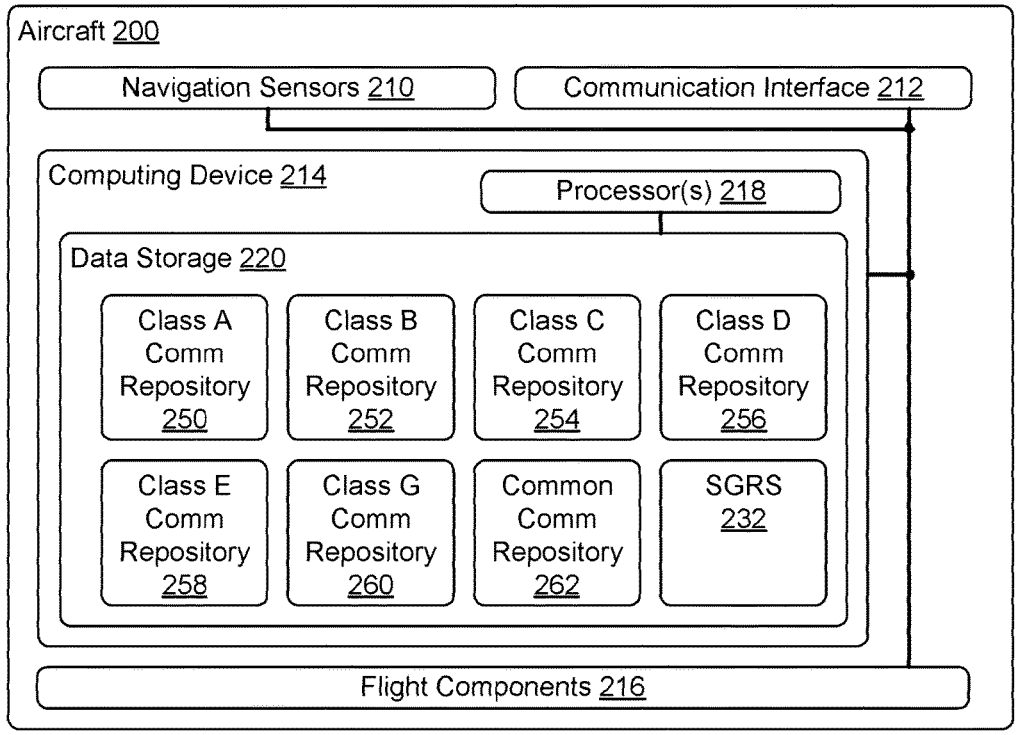
FIG. 2B is another block diagram of an aircraft, according to an example embodiment.

FIG. 2B shows another block diagram of aircraft 200, according to an example embodiment. FIG. 2B shows that aircraft 200 can include navigation sensors 210, communication interface 212, computing device 214, and flight components 216. Navigation sensors 210, communication interface 212, and flight components 216 can be as discussed herein in the context of FIG. 2A.

Computing device 214 includes one or more processors 218 and data storage 220. Processor(s) 218 can be one or more computer processors such as computer processors 403 discussed herein in the context of FIG. 4A. Data storage 220 can include one or more computer-readable storage media, such as data storage 404 discussed herein in the context of FIG. 4A. As shown in FIG. 2B, data storage 220 can store a plurality of communication repositories 250, 252, 254, 256, 258, 260, 262 and speech generation and/or recognition software 232. In some examples, one or more of communication repositories 250, 252, 254, 256, 258, 260, 262 can be formatted as communication repository 1000, communication repository 1010, communication repository 1020, communication repository 1030, and/or communication repository 1040 discussed herein in the context of FIGS. 10A-10E. Speech generation and/or recognition software 232 can, when executed by processor(s) 218 can perform at least the set of functions discussed herein in the context of FIG. 2A

Communication repositories 250, 252, 254, 256, 258, 260 can store one or more terms related to aviation communications in or otherwise related to a particular airspace classification; such as respective class A airspace, class B airspace, class C airspace, class D airspace, class D airspace, class E airspace, and class G airspace classifications. Communication repository 262 store one or more terms related to multiple/all airspace classifications; i.e., terms in communication repository 262 can be common to multiple/all airspaces. For example, communication repository 262 can include at least one of: a word associated with a geographic position, a word associated with a route, a word associated with a direction, a word associated with a unit of measure, a word associated with a number, and a word associated with a meteorological condition. In some examples, communication repositories 230a, 230b, 230c can store one or more terms related to aviation communications that are based on particular airspace classification(s) such as discussed herein in the context of communication repositories 250, 252, 254, 256, 258, 260, and 262.

In some embodiments, aircraft 200 can be configured with software and/or hardware that enables aircraft 200 to be operated as an unmanned aerial system; e.g., software and/or for automated and/or remotely-operated flight control. In still other embodiments, computing device 214 can be utilized outside of aircraft 200; e.g speech generation and/or recognition software 232 can, when executed by processor (s) 218 can perform at least the set of functions, discussed herein in the context of FIG. 2A to generate and/or recognize aviation communications related to an air traffic control entity, a ground control entity, and/or one or more entities other than aircraft 200 that may participate in aviation communications. For example, speech generation and/or recognition software 232 can embody one or more communication parameters that specify how communications in one or more associated airspaces are to be conducted. In particular, speech generation and/or recognition software 232 can embody one or more communication parameters and/or rules to select one or more communication repositories based on a particular airspace classification; e.g., while generating and/or recognizing one or more communications in an airspace associated with the particular airspace classification.

IV. Example Data Network

Figure 3:
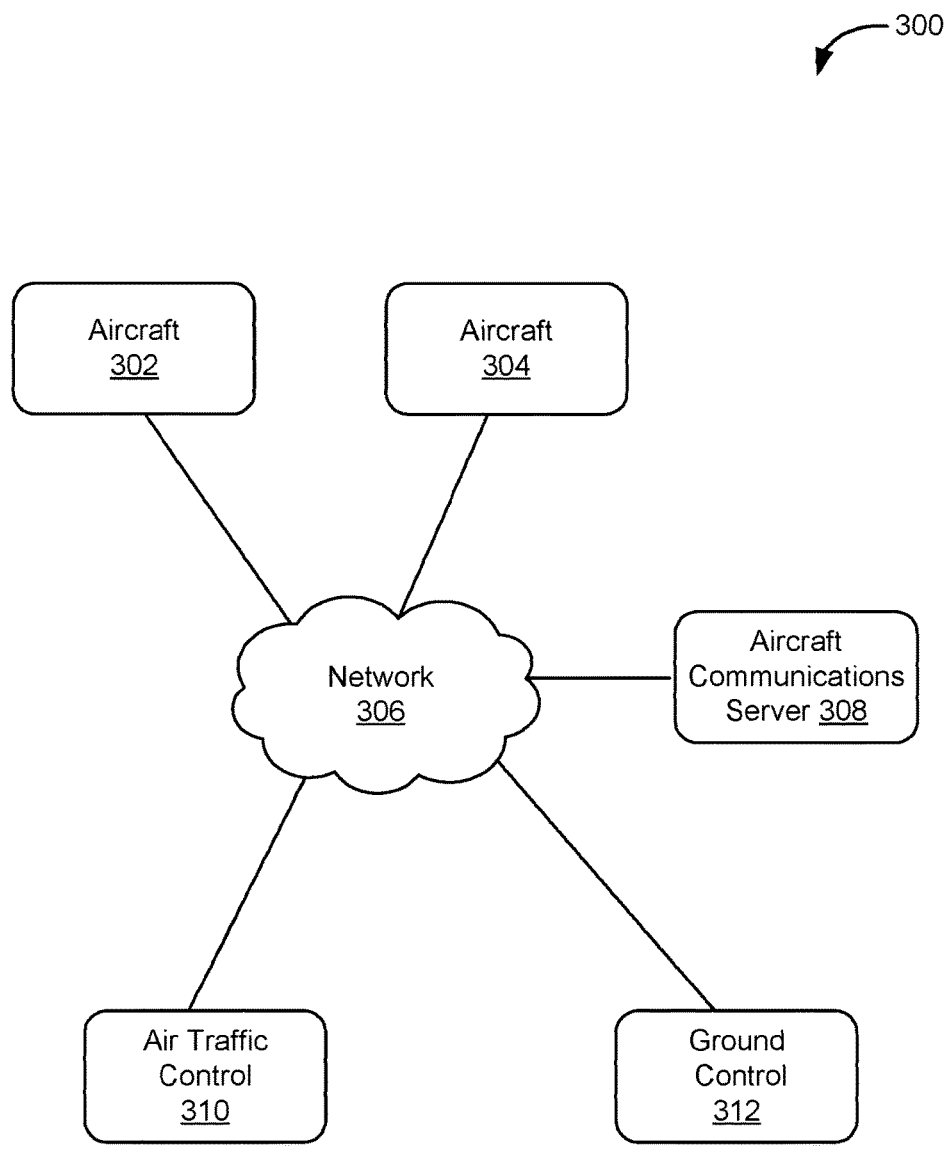
FIG. 3 depicts a distributed computing architecture, in accordance with an example embodiment.

FIG. 3 depicts data network 300 with aircraft communications server 308 configured to communicate, via network 306, with aircraft 302, 304, air traffic control 310, and ground control 312 in accordance with an example embodiment. Network 306 may correspond to a LAN, a wide area network (WAN), a corporate intranet, the public Internet, or any other type of network configured to provide a communications path between networked computing devices. Network 806 may also correspond to a combination of one or more LANs, WANs, corporate intranets, and/or the public Internet.

Although FIG. 3 only shows two aircraft, one air traffic control, one ground control and one aircraft communications server, data networks may serve tens, hundreds, or thousands of computing devices. Moreover, aircraft 302, 304 (or any additional aircraft) can include one or more computing devices, such as computing device 400 described herein.

Aircraft communications server 308 can be configured to generate and/or recognize aircraft communications using at least some of the techniques described herein. In particular, aircraft communications server 308 can include one or more term depositories, such as discussed herein at least in the context of FIGS. 3A and 3B, to generate and/or recognize voice and perhaps data communications involving one or more aircraft such as aircraft 302, 304, air traffic control entities such as air traffic control 310, ground control entity such as ground control 312, and/or other entities involved in mechanized flight. In some embodiments, voice and perhaps data communications involving one or more aircraft can include compressed and/or uncompressed content and/or can include encrypted and/or unencrypted content. Other types of content are possible as well. Many other examples of server devices are possible as well.

V. Computing Device Architecture

Figure 4A:
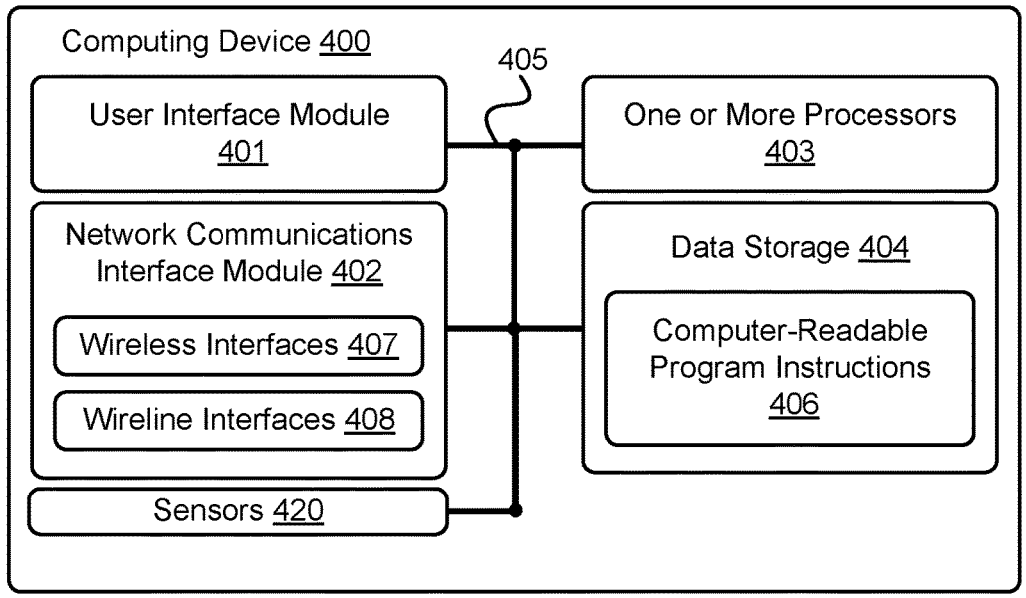
FIG. 4A is a functional block diagram of an example computing device, in accordance with an example embodiment.

FIG. 4A is a functional block diagram of computing device 400, in accordance with an example embodiment. In particular, computing device 400 shown in FIG. 4A can be configured to perform at least one function related to one or more of: aircraft 200, 302, 304, 614 navigation sensors 210, communication interface 212, computing device 214, flight components 216, processor(s) 218, data storage 220, communication repositories 230a, 230b, 230c, 250, 252, 254, 256, 258, 260, 262, speech generation and/or recognition software 232, networks 300, 306, aircraft communications server 308, air traffic control 310, ground control 312, method 500, scenarios 600, 800, and communication flows 700, 900.

Computing device 400 may include a user interface module 401, a network-communication interface module 402, one or more processors 403, data storage 404, and one or more sensors 420, all of which may be linked together via a system bus, network, or other connection mechanism 405.

User interface module 401 can be operable to send data to and/or receive data from external user input/output devices. For example, user interface module 401 can be configured to send and/or receive data to and/or from user input devices such as a keyboard, a keypad, a touch screen, a computer mouse, a track ball, a joystick, a camera, a voice recognition module, and/or other similar devices. User interface module 401 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 401 can also be configured to generate audible output(s), such as a speaker, speaker jack, audio output port, audio output device, earphones, and/or other similar devices.

Network-communications interface module 402 can include one or more wireless interfaces 407 and/or one or more wireline interfaces 408 that are configurable to communicate via a network. Wireless interfaces 407 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 408 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network. In some embodiments, network-communications interface module 402 can perform at least some of the functionality of communication interface 212 of aircraft 200 discussed herein in the context of at least FIGS. 2A and 2B. For example, network-communications interface module 402 can include a tunable aviation radio configured for use in voice communications and/or a radar transponder for automatically reporting data, such as one or more altitude data and squawk codes related to an aircraft.

In some embodiments, network communications interface module 402 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 403 can be one or more computer processors, which can include one or more general purpose processors, and/or one or more special purpose processors (e.g., digital signal processors, graphics processing units, application specific integrated circuits, etc.). One or more processors 403 can be configured to execute computer-readable program instructions 406 that are contained in data storage 404 and/or other instructions as described herein.

Data storage 404 can include one or more computer-readable storage media that can be read and/or accessed by at least one of one or more processors 403. The one or more computer-readable storage media can include volatile and/or non-volatile storage components, such as optical, magnetic, organic or other memory or disc storage, which can be integrated in whole or in part with at least one of one or more processors 403. In some embodiments, data storage 404 can be implemented using a single physical device (e.g., one optical, magnetic, organic or other memory or disc storage unit), while in other embodiments, data storage 404 can be implemented using two or more physical devices.

Data storage 404 can include computer-readable program instructions 406 and perhaps additional data. In some embodiments, data storage 404 can additionally include storage required to perform at least part of the herein-described methods, scenarios, and techniques and/or at least part of the functionality of the herein-described devices and networks. In some embodiments, data storage 404 can store one or more communication repositories and/or speech generation and/or recognition software such as discussed herein in the context of data storage 220 of FIGS. 2A and 2B.

In some embodiments, computing device 400 can include one or more sensors 420. Sensor(s) 420 can be configured to measure conditions in an environment of computing device 400 and provide data about that environment. For example, sensor(s) 420 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of computing device 400, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 400, such as, but not limited to, an altimeter, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 400, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 420 are possible as well. In some embodiments, sensors 420 can include some or all of navigation sensors 210 discussed herein in the context of FIGS. 2A and 2B.

Figure 4B:
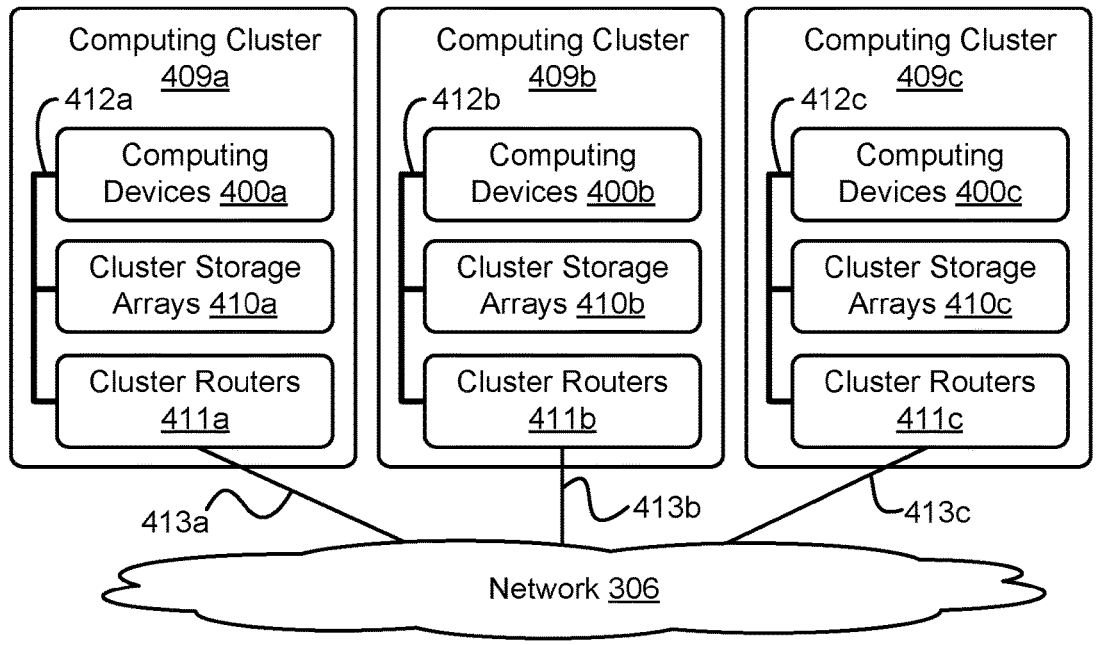
FIG. 4B depicts a network of computing clusters arranged as a cloud-based server system, in accordance with an example embodiment.

FIG. 4B depicts a network 306 of computing clusters 409a, 409b, 409c arranged as a cloud-based server system in accordance with an example embodiment. Computing clusters 409a, 409b, 409c can be cloud-based devices that store program logic and/or data of cloud-based applications and/or services; e.g., perform at least one function related to one or more of: aircraft 200, 302, 304, 614 navigation sensors 210, communication interface 212, computing device 214, flight components 216, processor(s) 218, data storage 220, communication repositories 230a, 230b, 230c, 250, 252, 254, 256, 258, 260, 262, speech generation and/or recognition software 232, networks 300, 306, aircraft communications server 308, air traffic control 310, ground control 312, method 500, scenarios 600, 800, and communication flows 700, 900.

In some embodiments, computing clusters 409a, 409b, 409c can be a single computing device residing in a single computing center. In other embodiments, computing clusters 409a, 409b, 409c can include multiple computing devices in a single computing center, or even multiple computing devices located in multiple computing centers located in diverse geographic locations. For example, FIG. 4B depicts each of computing clusters 409a, 409b, and 409c residing in different physical locations.

In some embodiments, data and services at computing clusters 409a, 409b, 409c can be encoded as computer readable information stored in non-transitory, tangible computer readable media (or computer readable storage media) and accessible by other computing devices. In some embodiments, computing clusters 409a, 409b, 409c can be stored on a single disk drive or other tangible storage media, or can be implemented on multiple disk drives or other tangible storage media located at one or more diverse geographic locations.

FIG. 4B depicts a cloud-based server system in accordance with an example embodiment. In FIG. 4B, functionality of an aircraft, a network, an aircraft communications server, an air traffic control, a ground control, and/or a computing device can be distributed among computing clusters 409a, 409b, 409c. Computing cluster 409a can include one or more computing devices 400a, cluster storage arrays 410a, and cluster routers 411a connected by a local cluster network 412a. Similarly, computing cluster 409b can include one or more computing devices 400b, cluster storage arrays 410b, and cluster routers 411b connected by a local cluster network 412b. Likewise, computing cluster 409c can include one or more computing devices 400c, cluster storage arrays 410c, and cluster routers 411c connected by a local cluster network 412c.

In some embodiments, each of computing clusters 409a, 409b, and 409c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 409a, for example, computing devices 400a can be configured to perform various computing tasks of an aircraft, a network, an aircraft communications server, an air traffic control, a ground control, and/or a computing device. In one embodiment, the various functionalities of a an aircraft, a network, an aircraft communications server, an air traffic control, a ground control, and/or a computing device can be distributed among one or more of computing devices 400a, 400b, 400c. Computing devices 400b and 400c in respective computing clusters 409b and 409c can be configured similarly to computing devices 400a in computing cluster 409a. On the other hand, in some embodiments, computing devices 400a, 400b, and 400c can be configured to perform different functions.

In some embodiments, computing tasks and stored data associated with an aircraft, a network, an aircraft communications server, an air traffic control, a ground control, and/or a computing device be distributed across computing devices 400a, 400b, and 400c based at least in part on the processing requirements of an aircraft, a network, an aircraft communications server, an air traffic control, a ground control, and/or a computing device, the processing capabilities of computing devices 400a, 400b, 400c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 410a, 410b, 410c of computing clusters 409a, 409b, 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of an aircraft, a network, an aircraft communications server, an air traffic control, a ground control, and/or a computing device can be distributed across computing devices 400a, 400b, 400c of computing clusters 409a, 409b, 409c, various active portions and/or backup portions of these components can be distributed across cluster storage arrays 410a, 410b, 410c. For example, some cluster storage arrays can be configured to store one portion of the data of an aircraft, a network, an aircraft communications server, an air traffic control, a ground control, and/or a computing device, while other cluster storage arrays can store other portion(s) of data of an aircraft, a network, an aircraft communications server, an air traffic control, a ground control, and/or a computing device. Additionally, some cluster storage arrays can be configured to store backup versions of data stored in other cluster storage arrays.

Cluster routers 411a, 411b, 411c in computing clusters 409a, 409b, 409c can include networking equipment configured to provide internal and external communications for the computing clusters. For example, cluster routers 411a in computing cluster 409a can include one or more internet switching and routing devices configured to provide (i) local area network communications between computing devices 400a and cluster storage arrays 410a via local cluster network 412a, and (ii) wide area network communications between computing cluster 409a and computing clusters 409b and 409c via wide area network connection 413a to network 306. Cluster routers 411b and 411c can include network equipment similar to cluster routers 411a, and cluster routers 411b and 411c can perform similar networking functions for computing clusters 409b and 409b that cluster routers 411a perform for computing cluster 409a.

In some embodiments, the configuration of cluster routers 411a, 411b, 411c can be based at least in part on the data communication requirements of the computing devices and cluster storage arrays, the data communications capabilities of the network equipment in cluster routers 411a, 411b, 411c, the latency and throughput of local networks 412a, 412b, 412c, the latency, throughput, and cost of wide area network links 413a, 413b, 413c, and/or other factors that can contribute to the cost, speed, fault-tolerance, resiliency, efficiency and/or other design criteria of the moderation system architecture.

VI. Example Methods of Operation

Figure 5:
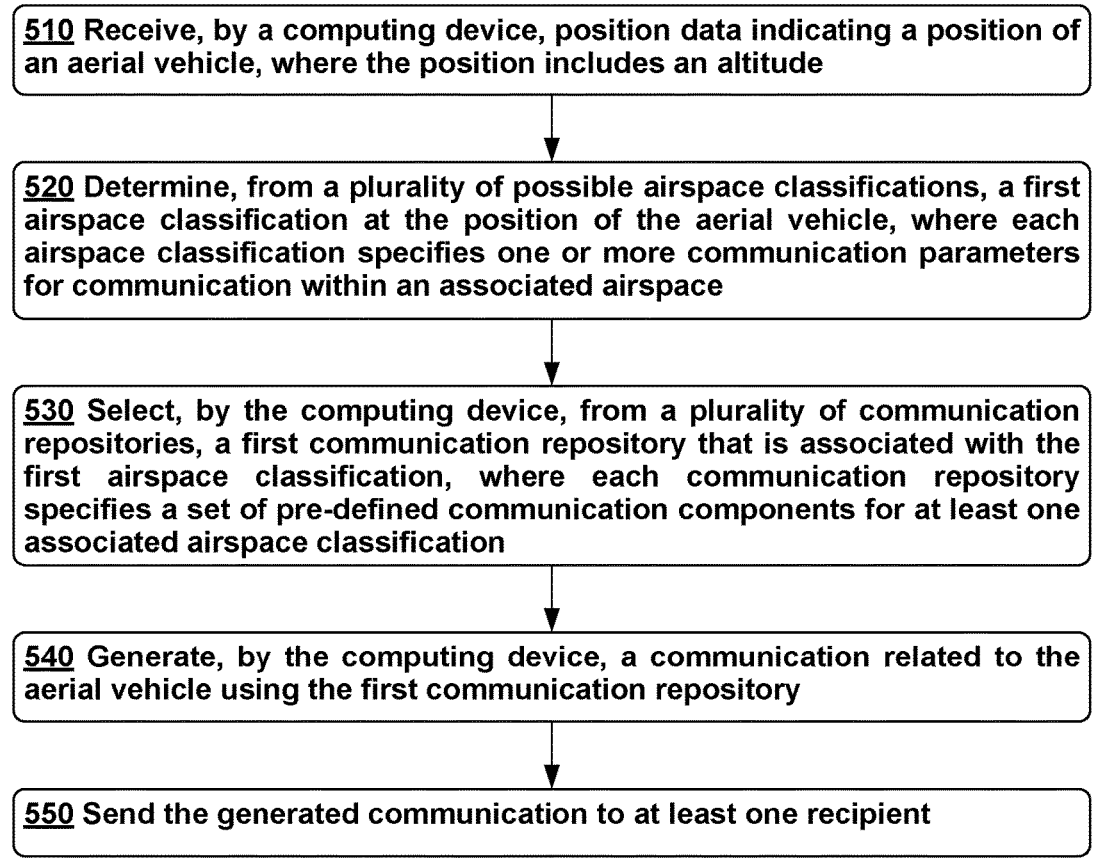
FIG. 5 is a flowchart of a method, in accordance with an example embodiment.

FIG. 5 is a flowchart of method 500, in accordance with an example embodiment. Method 500 can be executed by a computing device, such as computing device 400.

Method 500 begins at block 510, where the computing device can receive position data indicating a position of an aerial vehicle, where the position includes, e.g., location and altitude, such as discussed herein at least in the context of FIGS. 2A, 2B, 7 and 9B. In some embodiments, the aerial vehicle can be configured as an autonomous aerial vehicle.

At block 520, a first airspace classification at the position of the aerial vehicle of a plurality of airspace classifications can be determined, where each airspace classification can specify one or more communication parameters for communication within an associated airspace, such as discussed herein at least in the context of FIGS. 1 and 2B. In some embodiments, the first airspace classification can be associated with one or more legally-defined airspace volumes, such as discussed herein at least in the context of FIG. 1.

At block 530, the computing device can select, from a plurality of communication repositories, a first communication repository that is associated with the first airspace classification, where each communication repository can specify a set of pre-defined communication components for at least one associated airspace classification, such as discussed herein at least in the context of FIGS. 2A, 2B, 7, and 9B. In some embodiments, the set of pre-defined communication components specified by the first communication repository can include one or more language segments, such as discussed herein at least in the context of FIGS. 2A, 2B, 7 and 9B-10E.

In other embodiments, the first airspace classification can be further associated with an airspace-related entity. Then, selecting the first communication repository can include selecting a communication repository from among the plurality of communication repositories based on the particular airspace classification and the airspace-related entity, such as discussed herein at least in the context of FIGS. 2A, 2B, 7 and 9B.

In still other embodiments, the plurality of communication repositories can further include a common communication repository that stores one or more words associated with each of the plurality of airspace classifications, such as discussed herein at least in the context of FIGS. 2A, 2B, 7 and 9B. In particular of these embodiments, the common communication repository can store at least one of: a word associated with a geographic position, a word associated with a route, a word associated with a direction, a word associated with a unit of measure, a word associated with a number, and a word associated with a meteorological condition, such as discussed herein at least in the context of FIGS. 2A and 2B.

At block 540, the computing device can generate a communication related to the aerial vehicle using the first communication repository, such as discussed herein at least in the context of FIGS. 2A, 2B, 7 and 9B. In some embodiments, the first airspace classification can be further associated with an airspace-related entity. Then, generating the communication related to the aerial vehicle can include generating a communication related to the aerial vehicle that is also associated with the airspace-related entity, such as discussed herein at least in the context of FIGS. 2A, 2B, 7 and 9B. In particular of these embodiments, generating the communication related to the aerial vehicle that is also associated with the airspace-related entity can include: receiving a received communication from the airspace-related entity at the computing device; and generating a response communication to the received communication using the first communication repository, such as discussed herein at least in the context of FIGS. 2A and 2B. In other embodiments, generating the communication related to the aerial vehicle using the first communication repository can include generating a voice communication, such as discussed herein at least in the context of FIGS. 2A, 2B, 7 and 9B.

At block 550, the generated communication can be sent to at least one recipient, such as discussed herein at least in the context of FIGS. 2A, 2B, 7 and 9B. For example, the computing device can send the communication related to the aerial vehicle to at least one recipient. In some embodiments, the first airspace classification can be further associated with an airspace-related entity. Then, the at least one recipient can include the airspace-related entity, such as discussed herein at least in the context of FIGS. 2A, 2B, 7 and 9B.

In some embodiments, method 500 can further include: after sending the communication related to the aerial vehicle, receiving a voice response communication at the computing device; and recognizing the voice response communication based on the first communication repository, such as discussed herein at least in the context of FIGS. 2A and 2B. In particular of these embodiments, receiving the voice response communication can include receiving the voice response communication from the at least one recipient, such as discussed herein at least in the context of FIGS. 2A and 2B.

In a variation on method 500, the computing system may initially receive position data indicating a future position of an aerial vehicle (e.g., a position where the aerial vehicle is expected to be at some time in the future). The computing system may then determine the airspace classification of the airspace in which the future position is located, and carry out the blocks 530 to 550 according to the future position of the aerial vehicle (instead of the current position).

VII. Example Aviation Communication Scenarios and Communication Flows

Figure 6:
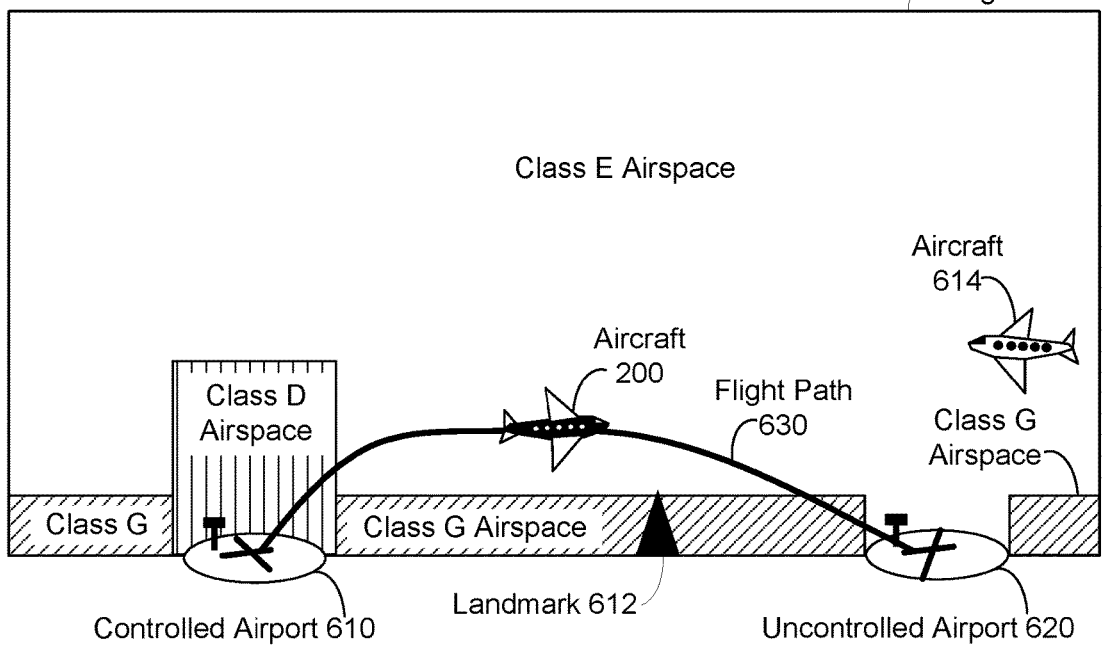
FIG. 6 shows an example flight diagram and flight plan related to a scenario, in accordance with an example embodiment.

FIG. 6 shows flight diagram 602 and flight plan 640 related to scenario 600, in accordance with an example embodiment. During scenario 600, aircraft 200 takes off/departs from controlled airport 610, which is named "CityA Airport", flies along flight path 630, and lands/arrives at uncontrolled airport 620 named "Town Airport" as shown in diagram 602. Flight plan 640 summarizes the flight between airports 610 and 620 that occurs during scenario 600 by aircraft 200 and indicates the flight will follow visual flight rules (VFR).

Diagram 602 shows that airport 610 has a tower and ground control to control air and ground travel, respectively, associated with the airport, and is surrounded by class D airspace. Each of the tower and the ground control at airport 610 has separate radio frequencies for communications. Uncontrolled airport 620 is associated with a universal communications (UNICOM) radio frequency that is monitored at all times, but air and ground traffic are not controlled at airport 620. Rather, aircraft flying in and around airport 620 follow procedures for airports without a control tower, such as expressed in Advisory *Circulars* 90-42F and 90-66A issued by the Federal Aviation Administration (FAA). Flight path 630, which is between airports 610 and 620, starts in the class D airspace surrounding airport 610 upon takeoff, proceeds into class E airspace, and travels into class G airspace while approaching and landing at airport 620.

Figure 7:
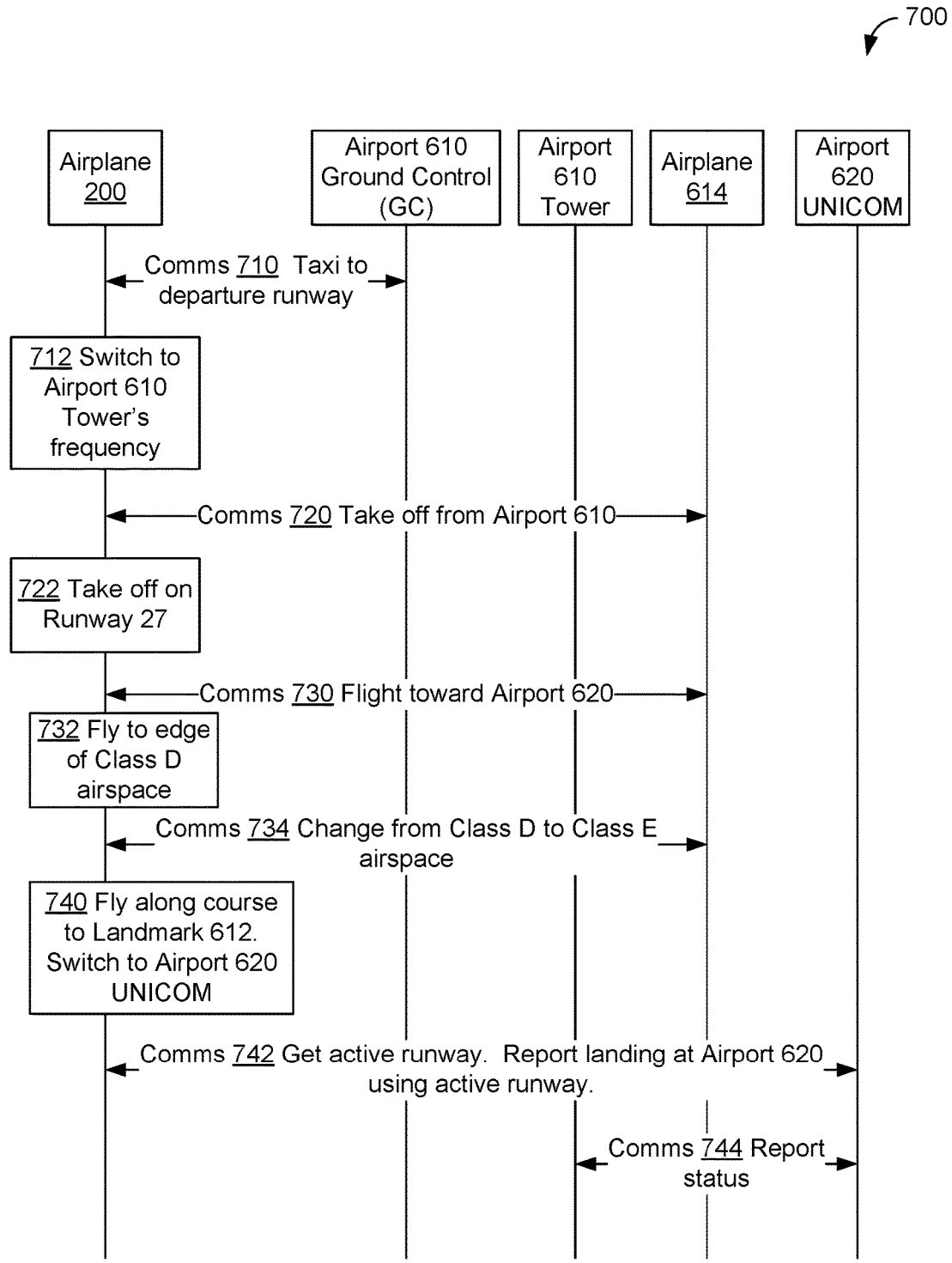
FIG. 7 is a diagram illustrating a communication flow related to the scenario of FIG. 6, in accordance with an example embodiment.

FIG. 7 is a flow diagram illustrating communication flow 700 corresponding to scenario 600, in accordance with an example embodiment. During scenario 600 and in communication flow 700, all communications are voice communications carried out by radio; in other scenarios and/or communication flows, some or all communications can be wireless data communications and/or wired communications.

Scenario 600 and communication flow 700 begin with aircraft 200 preparing for departure from airport 610. A radio of communications interface 210 of aircraft 200 is initially tuned to a radio frequency associated with airport 610 ground control (GC). In scenario 600 and communication flow 700, airport 610 ground control is a traffic control entity controlling ground transportation at airport 610. In scenarios 600 and 800 and in communication flows 700 and 900, many communications originated by an originating entity and intended for a terminating entity start with the name of the terminating entity, followed by the name of the originating entity, and then followed by any information to be conveyed in the communication. For example, a communication from aircraft 200 to airport 610's tower, which can be called "CityA Tower" below, to request permission to take off can be presented herein as follows:

AIRCRAFT 200: CityA Tower, Aircraft 200, Request permission to take off.

In scenario 600 and communication flow 700, airport 610's tower is an air traffic control entity controlling the airspace that includes runways of airport 610. Communication flow 700 continues with communications (Comms) 710 between aircraft 200 and airport 610 ground control, which can be called "CityA Ground" below, for obtaining clearance to taxi to runway 27 of airport 610, in preparation for taking off/departing from airport 610. In communication flow 700, communications 710 include the following communications between aircraft 200 and airport 610 ground control:

AIRCRAFT 200: CityA Ground, Aircraft two zero zero with information.

CITYA GROUND: Aircraft two zero zero, CityA Ground, go ahead.

AIRCRAFT 200: CityA Ground, Aircraft two zero zero is on the north ramp, departing to east, climbing to three thousand, ready to taxi.

CITYA GROUND Aircraft two zero zero, CityA Ground, Taxi via taxiway alpha to runway two seven.

After communications 710 grant aircraft 200 permission to taxi via taxiway A to runway 27, aircraft 200 can carry out the procedures of block 712 to tune the radio frequency for a radio of aircraft 200 to a radio frequency associated with airport 610's tower.

Communication flow 700 continues with communications 720 between aircraft 200 and airport 610's tower related to aircraft 200's take off/departure from airport 610 via runway 27. In communication flow 700, communications 720 include the following communications between aircraft 200 and airport 610's tower:

AIRCRAFT 200: CityA Tower, Aircraft two zero zero at runway two-seven, ready for departure, request clearance for VFR takeoff.

CITYA TOWER: Aircraft two zero zero, CityA tower, Cleared for takeoff on runway two-seven.

AIRCRAFT 200: City A Tower, Aircraft two zero zero, Roger—cleared for takeoff.

After communications 720 grant aircraft 200 permission to take off via runway 27, aircraft 200 can carry out the procedures of block 722 to take off from airport 610 using runway 27 and begin flying toward airport 620.

Communication flow 700 continues with communications 730 between aircraft 200 and airport 610's tower related to aircraft 200's flight toward airport 620:

CITYA TOWER: Aircraft two zero zero, CityA tower, Fly runway heading until reaching three thousand, turn right on course and maintain three thousand until landmark 612.

AIRCRAFT 200: CityA Tower, Aircraft two zero zero, Roger—fly nine zero until reaching three thousand, turn right on course, and maintain three thousand until landmark 612.

After carrying out communications 730, aircraft 200 can carry out the procedures of block 732 to fly to the edge of class D airspace controlled by airport 610's tower and carry out communications 734 regarding changing from class D controlled flight to visual flight rules (VFR) flight procedures in classes E and G airspaces. A "squawk" is a setting for a transponder to generate a squawk code that identifies aircraft 200 when radar service is available; e.g., airspaces in classes A, B, C, D, and perhaps E.

In communication flow 700, communications 734 include the following communications between aircraft 200 and airport 610's tower:

CITYA TOWER: Aircraft two zero zero, City A tower, Cleared out of class delta.

AIRCRAFT 200: City A Tower, Aircraft two zero zero, Cleared out of class delta.

CITYA TOWER: Aircraft two zero zero, CityA tower, Radar service is terminated. Squawk one two zero zero.

AIRCRAFT 200: CityA Tower, Aircraft two zero zero, Roger—radar service is terminated and squawk one two zero zero.

CITYA TOWER: Aircraft two zero zero, CityA tower, Frequency change approved.

Scenario 600 and communication flow 700 continue with aircraft 200 following the procedures of block 740 to continue on course and overfly landmark 612. At that point, aircraft 200 begins to descend toward airport 620, which can be called "Town Airport" below. In scenario 600 and communication flow 700, airport 620 is an uncontrolled airport that monitors a UNICOM frequency. Also, aircraft 200 tunes the radio frequency for its radio to the UNICOM frequency associated with uncontrolled airport 620.

When aircraft 200 is within radio contact with airport 620, communication flow 700 continues with communications 742 between aircraft 200 and airport 620 related to aircraft 200's upcoming landing at airport 620. First, aircraft 200 requests information about an active runway at airport 620 using the following portion of communications 742:

AIRCRAFT 200: Town Airport UNICOM, Aircraft two zero zero, Requesting the active.

TOWN AIRPORT UNICOM: Active at Town Airport is three-two.

Then, aircraft 200 reports its progress toward landing using runway 32 at airport 620 to all traffic near airport 620 using the airport 620 UNICOM radio frequency as the following portion of communications 742:

AIRCRAFT 200: Town Airport Traffic, Aircraft two zero zero, Seven miles east, will overfly the field at one thousand two hundred feet for a left downwind entry to runway three two.

In scenario 600, aircraft 200 proceeds to within one mile west of airport 620, and in and communication flow 700, communications 742 continue as follows:

AIRCRAFT 200: Town Airport Traffic, Aircraft two zero zero, One mile west, to enter the left downwind entry to runway three two.

Scenario 600 continues with aircraft 614 coming within range of airport 620's radio. In communication flow 700, aircraft 614 communicates its status to all traffic near airport 620 using the airport 620 UNICOM radio frequency as communications 744 as follows:

AIRCRAFT 614: Town Airport Traffic, Aircraft four one four, Seven miles east, continuing at four thousand feet.

Scenario 600 continues with aircraft 200 landing at active runway 32 of airport 620 and communication flow 700 continues with communications 742 continuing between aircraft 200 and all traffic near airport 620 as follows:

AIRCRAFT 200: Town Airport Traffic, Aircraft two zero zero, Roger that aircraft four one four is seven miles east of Town Airport at four thousand feet.

AIRCRAFT 200: Town Airport Traffic, Aircraft two zero zero, Left downwind for runway three two, Town Airport.

AIRCRAFT 200: Town Airport Traffic, Aircraft two zero zero, On final for runway three two, Town Airport.

AIRCRAFT 200: Town Airport Traffic, Aircraft two zero zero is leaving the active.

In communication flow 700, aircraft 200 can generate and/or recognize communications 710, 720, and 730 using communications data using class D communication repository 256 and common communication repository 262, as communications 710, 720, and 730 take place in the class D airspace surrounding airport 610. Also, aircraft 200 can generate and/or recognize communications 734 and 744 using communications data using class E communication repository 258 and common communication repository 262, as communications 710, 720, and 730 take place in class E airspaces. Further, aircraft 200 can generate and/or recognize communications 742 using communications data using class G communication repository 260 and common communication repository 262, as communications 742 take place in a class G airspace surrounding airport 620.

In some embodiments, aircraft 200 can recognize communications 744 using class G communication repository 260 and common communication repository 262, as aircraft 200 in in a class G airspace when receiving communications 744 from aircraft 614, even though communications 744 are originated by aircraft 614 that is in a class E airspace. In still other embodiments, aircraft 200 can recognize communications 744 using class E communication repository 258, class G communication repository 260, and common communication repository 262, as communications 744 are originated by aircraft 614 in class E airspace and received by aircraft 200 while aircraft 200 is in class G airspace.

For example, at the beginning of scenario 600 and communication flow 700, aircraft 200 can receive position data from navigational sensors 210 and perhaps other devices and determine an airspace classification associated with a current location of aircraft 200; e.g., a location at airport 610 that is associated with a class D airspace. Then, speech generation and/or recognition software 232 of aircraft 200 can select class D communication repository 256 and common communication repository 262 based on the determination that aircraft 200 is at a position associated with class D airspace. Speech generation and/or recognition software 232 of aircraft 200 can then use communication data stored in class D communication repository 256 and common communication repository 262 to generate and/or recognize some or all of communications 710 with airport 610 ground control. Similar techniques used to generate communications 710 can be used to generate and/or recognize some or all of communications 720, 730, 734, 742, and 744 of scenario 600 and communication flow 700.

In other scenarios and/or communication flows, speech generation and/or recognition software 232 and/or communication repositories 230a-230c, 250, 252, 254, 256, 258, 260, 262 can be executed and stored on one or more computing devices not located in aircraft 200. Then, aircraft 200 can provide position data and perhaps other information to the one or more computing devices executing speech generation and/or recognition software 232, speech generation and/or recognition software 232 of aircraft 200 can generate and/or recognize at least some of communications of scenario 600 and communication flow 700, and then communicate information about the generated and/or recognized communications to aircraft 200.

After completing communications 744, aircraft 200 can taxi from active runway 32 to a hangar at airport 620 and shut down. After aircraft 200 shuts down, scenario 600 and communication flow 700 can be completed.

Figure 8:
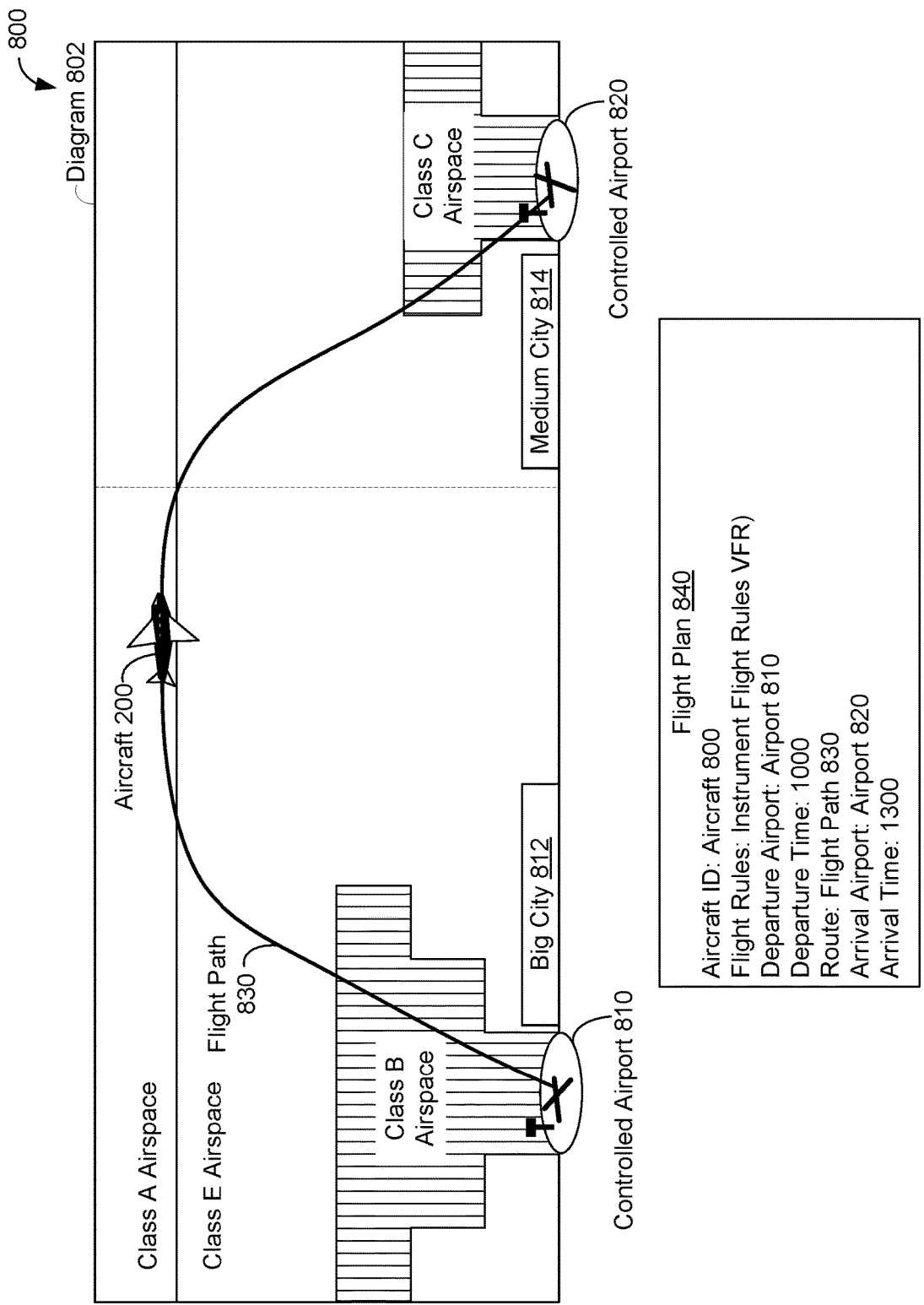
FIG. 8 shows an example flight diagram and flight plan related to a scenario, in accordance with an example embodiment.

FIG. 8 shows flight diagram 802 and flight plan 840 related to scenario 800, in accordance with an example embodiment. During scenario 800, aircraft 200 takes off/ departs from controlled airport 810 for Big City 812 in class B airspace, flies along flight path 830 in class B, E, A, and C airspaces, and lands/arrives at controlled airport 820 for Medium City 814 as shown in diagram 802. Flight plan 840 summarizes the flight between airports 810 and 820 that occurs during scenario 800 by aircraft 200 and indicates the flight will follow instrument flight rules (IFR).

In scenario 800, Big City 812 and the surrounding airspace is in one airspace region controlled by a regional air traffic control entity termed "Big City Center", and Medium City 814 and the surrounding airspace is in a different airspace region controlled by a regional air traffic control entity termed "Medium City Center". Diagram 802 include a dashed vertical line indicating a dividing line between the airspace region controlled by Big City Center and the airspace region controlled by Medium City Center.

Figure 9A:

FIGS. 9A and 9B are a flow diagram illustrating communication flow 900 related to scenario 800, in accordance with an example embodiment. During scenario 800 and in communication flow 900, all communications are voice communications carried out by radio; in other scenarios and/or communication flows, some or all communications can be wireless data and/or wired communications.

Scenario 800 and communication flow 900 begin with aircraft 200 preparing for departure from airport 810. A radio of communications interface 210 of aircraft 200 is initially tuned to a radio frequency associated with airport 810's control tower, which can be called "Big City Tower" below.

In scenario 800 and communication flow 900, airport 810 tower is an air traffic control entity controlling the airspace that includes runways of airport 810. Also, many communications of scenario 800 and communication flow 900 originated by an originating entity and intended for a terminating entity start with the name of the terminating entity, followed by the name of the originating entity, and then followed by any information to be conveyed in the communication, such as discussed above in the context of FIG. 7.

Communication flow 900 continues with communications 910 between aircraft 200 and airport 810 tower for obtaining clearance to depart from airport 810. In communication flow 900, communications 910 include the following communications between aircraft 200 and airport 810 tower:

AIRCRAFT 200: Big City Tower, Aircraft two zero zero, Request IFR to Medium City at 20000.

BIG CITY TOWER: Aircraft two zero zero, Cleared to depart north. Maintain three thousand until clear of Class B airspace. Departure frequency one two eight point seven. Squawk one two three.

Scenario 800 and communication flow 900 continues with aircraft 200 getting automated weather information from Automated Terminal Information Service (ATIS) associated with Airport 810 as follows:

ATIS: Big City Airport automated airport information foxtrot, 2125Z, Winds 190 at 10. Visibility 15 miles. No clouds. Temperature 15, dew point 10. Altimeter 29.90. Landing and departing runway 01. All taxiways open. All aircraft read back short instruction. Caution: balloon festival 20 miles west of airport. Advise on initial contact you have information foxtrot.

Communications 910 between aircraft 200 and airport 810 tower continue as follows:

AIRCRAFT 200: Big City Tower, Cleared north. Maintain three thousand until clear of class B airspace. Departure frequency 128 point 7. Squawk 123 with Foxtrot.

BIG CITY TOWER: Aircraft two zero zero, Readback correct.

Aircraft 200 can carry out the procedures of block 912 to tune the radio frequency for a radio of aircraft 200 to a radio frequency associated with ground control at airport 810. Scenario 800 and communication flow 900 continue with communications 914 between aircraft 200 and airport 810 ground control for obtaining clearance to taxi to runway 01 of airport 810 in preparation for taking off/departing from airport 810, where airport 810 ground control is a traffic control entity controlling ground transportation at airport 810 that can be called "Big City Ground" below.

In communication flow 900, communications 914 include the following communications between aircraft 200 and airport 810 ground control:

AIRCRAFT 200: Big City Ground, Aircraft two zero zero, Ready to taxi IFR.

BIG CITY GROUND: Aircraft two zero zero, Cleared to taxi on taxiway bravo to runway zero one.

AIRCRAFT 200: Big City Ground, Roger cleared to taxi on taxiway bravo to runway zero one.

After communications 914 grant aircraft 200 permission to taxi via taxiway B (Bravo) to runway 01, aircraft 200 can carry out the procedures of block 920 to taxi to runway 01 via taxiway B and then tune the radio frequency for the radio of aircraft 200 to the radio frequency associated with airport 810's tower.

Communication flow 900 continues with communications 922 between aircraft 200 and airport 810's tower related to granting aircraft 200 clearance to and airplane 200's subsequent takeoff/departure from airport 810 via runway 01. In communication flow 900, communications 922 include the following communications between aircraft 200 and airport 810's tower:

AIRCRAFT 200: Big City Tower, Ready for takeoff IFR on runway zero one.

BIG CITY TOWER: Aircraft two zero zero, Winds one niner zero at fourteen, cleared for takeoff.

AIRCRAFT 200: Cleared for takeoff on runway zero one, Aircraft two zero zero.

Communication flow 900 continues with aircraft 200 carrying out the procedures of block 930 to take off from airport 810 via runway 01. Next, airport 810 tower and aircraft 200 carry out communications 932 related to switching air traffic control from airport 810 tower to Big City Departure. In scenario 800, Big City Departure is an air traffic control entity controlling the airspace just outside of the runways of airport 810.

Communications 932 can proceed as follows:

BIG CITY TOWER: Aircraft two zero zero. Contact Departure.

AIRCRAFT 200: Switching to Departure, Two zero zero. Aircraft 200 can then carry out the procedures of block 934 to tune the radio frequency for the radio of aircraft 200 to a radio frequency associated with Big City Departure.

Turning to FIG. 9B, after carrying out the procedures of block 934, aircraft 200 can proceed along flight path 830 to class A airspace at flight level 200 (20,000 feet at standard pressure), while carrying out following communications 940 with Big City Departure.

AIRCRAFT 200: Big City Departure, Aircraft two zero zero, At seven hundred climbing to three thousand.

BIG CITY DEPARTURE: Aircraft two zero zero, Big City Departure, Radar contact.

In scenario 800, aircraft 200 reaches 3000 feet and maintains that altitude until leaving class B airspace. In communication flow 900, communications 940 continue as follows:

BIG CITY DEPARTURE: Aircraft two zero zero, Climb and maintain flight level two hundred.

AIRCRAFT 200: Big City Departure, Aircraft two zero zero, Climbing to flight level two hundred.

In scenario 800, aircraft 200 begins to climb to flight level 200. Then, upon reaching an altitude of 15000 feet, aircraft 200 reaches class A airspace and sets its altimeter to 29.92 inches of mercury, which is standard pressure for class A airspace. In communication flow 900, communications 940 continue as follows:

BIG CITY DEPARTURE: Aircraft two zero zero, Contact Big City Center at one three five point four.

AIRCRAFT 200: Aircraft two zero zero at one two seven point four.

Aircraft 200 can carry out the procedures of block 942 to tune the radio frequency for the radio of aircraft 200 to 127.4, which is a radio frequency associated with Big City Center. After carrying out the procedures of block 942, Aircraft 200 and Big City Center can carry out the following communications 950 while aircraft 200 proceeds along flight path 830:

BIG CITY CENTER: Aircraft two zero zero, Big City Center, Maintain flight level two hundred.

AIRCRAFT 200: Big City Center, Aircraft two zero zero, Maintaining flight level two hundred.

When aircraft 200 nears the boundary of the airspace region controlled by Big City Center, communications 950 continue as follows:

BIG CITY CENTER: Aircraft two zero zero, Contact Medium City Center at one two six point niner.

AIRCRAFT 200: Aircraft two zero zero at one two six point niner.

Aircraft 200 can then carry out the procedures of block 952 to tune the radio frequency for the radio of aircraft 200 to 126.9, which is a radio frequency associated with Medium City Center. After carrying out the procedures of block 952, aircraft 200 can proceed along flight path 830 toward airport 820 and can carry out the following communications 960 with Medium City Center:

AIRCRAFT 200: Medium City Center, Aircraft two zero zero, Flight level one fifty, request permission to enter class E airspace.

MEDIUM CITY CENTER: Aircraft two zero zero, Permission to enter class E airspace granted.

Scenario 800 continues with aircraft 200 proceeding along flight path 830 toward airport 820. Communication flow 900 continues with communications 960 as follows:

MEDIUM CITY CENTER: Contact Medium City Approach at one one seven point six.

AIRCRAFT 200: Aircraft two zero zero at one one seven point six.

Aircraft 200 can carry out the procedures of block 962 to tune the radio frequency for the radio of aircraft 200 to 117.6, which is a radio frequency associated with Medium City Approach. In scenario 800 and communication flow 900, Medium City Approach is an air traffic control entity controlling the airspace just outside of the runways of airport 820.

After carrying out the procedures of block 962, aircraft 200 and Medium City Approach can carry out the following communications 970 while aircraft 200 proceeds along flight path 830 in preparation for landing at airport 820, which can be called "Medium City Airport" below:

AIRCRAFT 200: Medium City Approach, Aircraft two zero zero, Altitude eight thousand.

MEDIUM CITY APPROACH: Aircraft two zero zero, Medium City Approach, Turn left heading two one three, descend and maintain six thousand.

AIRCRAFT 200: Medium City Approach, Aircraft two zero zero, Turning left to two one three, descending to six thousand.

In scenario 800, aircraft 200 turns left to 213 degrees and descends to 6,000 feet while approaching airport 820 along flight path 830. In communication flow 900, communications 970 continue as follows:

MEDIUM CITY APPROACH: Aircraft two zero zero, Medium City Approach, Turn left heading one eight two, descend and maintain four thousand, slow to one five zero knots.

AIRCRAFT 200: Medium City Approach, Aircraft two zero zero, Turning left to one eight two, descending to four thousand, slowing to one five zero knots.

In scenario 800, aircraft 200 turns left to 182 degrees and descends to 4,000 feet slowing to 150 knots (nautical miles per hour) while approaching airport 820 along flight path 830. In communication flow 900, communications 970 continue as follows:

MEDIUM CITY APPROACH: Aircraft two zero zero, Medium City Approach, Contact Medium City Tower at one one niner point niner.

AIRCRAFT 200: Aircraft two zero zero, Going to Medium City Tower frequency.

Aircraft 200 can then carry out the procedures of block 972 to tune the radio frequency for the radio of aircraft 200 to 119.9, which is a radio frequency associated with airport 820 tower, which can be called "Medium City Tower". In scenario 800 and communication flow 900, airport 820 tower is an air traffic control entity controlling the airspace that includes runways of airport 820.

After carrying out the procedures of block 972, aircraft 200 and airport 820 tower can carry out the following communications 980 as aircraft 200 proceeds to land on runway 34 of airport 820:

AIRCRAFT 200: Medium City Tower, Aircraft two zero zero, Requesting clearance to land.

MEDIUM CITY TOWER: Aircraft two zero zero, Medium City Tower, cleared to land on runway three four.

AIRCRAFT 200: Medium City Tower, Aircraft two zero zero, Roger—cleared to land on runway three four.

Scenario 800 continues with aircraft 200 landing at airport 820 on runway 34 and then carrying out the procedures of block 982 to tune the radio frequency for the radio of aircraft 200 to a radio frequency associated with airport 820 ground control. In scenario 800 and communication flow 900, airport 820 ground control is a traffic control entity controlling ground transportation at airport 820 that can be called "Medium City Ground". After the procedures of block 982 are completed, aircraft 200 and airport 820 ground control can carry out the following communications 990 while aircraft 200 proceeds to Hangar 3 at airport 820:

AIRCRAFT 200: Medium City Ground, Aircraft two zero zero, Off runway three four at Taxiway Bravo.

Medium City GROUND: Aircraft two zero zero, Medium City Ground, Follow Taxiway Bravo to Taxiway Golf. Take right onto Golf to Hangar 3.

AIRCRAFT 200: Medium City Ground, Roger—Bravo to Golf and right to Hangar 3.

In communication flow 900, aircraft 200 can generate and/or recognize communications 910, 914, 922, and 932 using communications data using class B communication repository 252 and common communication repository 262, as communications 910, 914, 922, and 932 take place in a class B airspace surrounding airport 810. Also, aircraft 200 can generate and/or recognize communications 940, 950, and 960 using communications data using class A communication repository 250 and/or class E communication repository 258 as well as common communication repository 262, as communications 940, 950, and 960 take place in class A and class E airspaces. Further, aircraft 200 can generate and/or recognize communications 970, 980, and 990 using communications data using class C communication repository 254 and common communication repository 262, as communications 970, 980, and 990 take place in a class C airspace surrounding airport 820.

For example, at the beginning of scenario 800 and communication flow 900, aircraft 200 can receive position data from navigational sensors 210 and perhaps other devices and determine an airspace classification associated with a current location of aircraft 200; e.g., a location at airport 810 that is associated with a class B airspace. Then, speech generation and/or recognition software 232 of aircraft 200 can select class B communication repository 252 and common communication repository 262 based on the determination that aircraft 200 is at a position associated with class B airspace. Speech generation and/or recognition software 232 of aircraft 200 can then use communication data stored in class B communication repository 252 and common communication repository 262 to generate and/or recognize some or all of communications 910 with airport 810 tower. Similar techniques used to generate and/or recognize communications 910 can be used to generate and/or recognize some or all of communications 914, 922, 932, 940, 950, 960, 970, 980, and 990 of scenario 800 and communication flow 900.

In other scenarios and/or communication flows, speech generation and/or recognition software 232 and/or communication repositories 230a-230c, 250, 252, 254, 256, 258, 260, 262 can be executed and stored on one or more computing devices not located in aircraft 200. Then, aircraft 200 can provide position data and perhaps other information to the one or more computing devices executing speech generation and/or recognition software 232, speech generation and/or recognition software 232 of aircraft 200 can generate and/or recognize at least some of communications of scenario 800 and communication flow 900, and then communicate information about the generated and/or recognized communications to aircraft 200.

After completing communications 990, aircraft 200 can taxi to Hangar 3 at airport 820 and shut down. After aircraft 200 shuts down, scenario 800 and communication flow 900 can be completed.

VII. Example Term Repositories

FIGS. 10A-10E illustrate communication repositories, according to example embodiments. A communication repository can be a data structure that enables storage, review, insertion, deletion, and/or modification of a collection of one or more pre-defined communication components and perhaps other data. In some embodiments, one or more databases can store one or more communication repositories. In particular, a communication repository can store pre-defined communication components for aviation-related communications.

Example communication components can include one or more terms. Some communication components can specify scope and relationships between terms. For example, communication components can specify how a term is to be used; e.g., for communication generation and/or for communication recognition, one or more airspace classifications associated with the term, related communication components and/or terms. As another example, a communication component can identify a particular term. Other communication components are possible as well.

A term can be a word, phrase, or template that is used in sending and/or receiving information; i.e., the term can be used in communications. A phrase can include two or more words. A template can include one or more pre-determined terms and/or later-determined terms, where the later-determined terms can be represented by one or more tags. That is, a tag can include a placeholder or other representation for the one or more later-determined terms. An example of a template follows:

"Turning <LorR> to heading <NumericHeading>",
where "<LorR>" is a tag representing a selection between the words "left" and "right", and where "<NumericHeading>" is a tag representing a selected number specifying a heading in degrees; e.g., a value between zero and 359. In some examples, tags can be associated with one or more rules indicating which terms can be used to evaluate the tag; e.g., a rule such as "<LorR>='left' OR 'right'" that indicates a tag "<LorR>" can be evaluated to either a term "left" or "right". In particular of these embodiments, tags can refer to other tags—for example, a rule such as "<NumericHeading>=<0To99> OR<100to359> AND degrees" indicates that the "<NumericHeading>" tag can involve evaluation of either a "<0To99>" tag, or a "<100to359>" tag and the word "degrees", where the "<0To99>" tag can evaluate to one "spelled-out" number between 0 and 359 using "niner" for the number 9; e.g., the "<0To99>" tag can evaluate to one of "zero" for 0, "one" for 1, . . . "niner" for 9, "one zero" for 10, "one one" for 11, "niner eight" for 98, and "niner niner" for 99. Also, the "<100to359>" tag can evaluate to one spelled-out word for a number between 100 and 359—the maximum numerical flight heading—as "one hundred" for 100, "one zero one" for 101, . . . "one niner niner" for 199, "two hundred" for 200, "two zero one" for 201, . . . "three five eight" for 358, and "three five niner" for 359. Then, in the specific example of a heading value of 250, the "<NumericHeading>" tag can be evaluated for the heading value of 250 to generate an output of "two five zero degrees". Other terms, tags and rules are possible as well.

To generate a communications output or to recognize a communications input based on this template, the tags can be evaluated to have specific values and those values used to generate the output. Continuing this example, if the tag <LorR> evaluated to "left", and the tag <NumericHeading> evaluated to "213", then the resulting communication can be "turning left to heading two one three degrees", where the bold words "left" and "two one three degrees" are generated based on the evaluated tag values. Many other terms, including many other words, phrases, and templates are possible as well.

FIG. 10A shows communication repository 1000 formatted to include term field 1002. That is, each row of communication repository 1000 can represent one communication component, which in this example includes a term in term field 1002. A term in term field 1002 can be a word such as "Word 1" shown in FIG. 10A, a tag such as "Tag 1" shown in FIG. 10A, a phrase such as "Phrase 1" shown in FIG. 10A, or a template such as "Template 1" shown in FIG. 10A.

In some examples, communication repository 1000 can relate to aviation-related and perhaps other communications, such as communications involving human-piloted aircraft and/or UASs. For example, each of the words "one", "two", "three", "four", "five", "six", "seven", "eight", "niner", and "zero", can be a "spelled-out" number, which can be one or more words corresponding to a respective number 1, 2, 3, 4, 5, 6, 7, 8, 9, and 0. In this example, "niner" can be a word used in aviation communications corresponding to the number 9. Example phrases related to aviation communications include "requesting clearance to take off", "cleared to take off", "requesting clearance to land", and "cleared to land", which are phrases related to departure/take off of an aircraft from an airport and related to landing/arrival of an airplane at an airport. In other examples, terms in communication repositories 1000, 1010, 1020, 1030, and/or 1040 can relate to other topics than aviation communications.

In some embodiments, a communication repository can include information about how terms in the communication repository can be used for automated communications. For example, in the case of automated voice/speech communications, the communication repository can store information about a term that indicates whether the term can be used for voice/speech recognition, whether the term can be used for voice/speech generation, and/or whether the term can be used for both voice/speech recognition and generation. Further, the communication repository can store other information about how terms in the communication repository can be used in communications as well.

FIG. 10B shows communication repository 1010 formatted to include term field 1012 and recognize/generate field (R/G) 1014. That is, each row of communication repository 1010 can represent one communication component. In this example, the communication component includes a term in term field 1012 and one communication component in recognize/generate field 1014. Term field 1012 can specify a term related to aviation communications, such as term 1002 discussed herein in the context of FIG. 10A. Recognize/generate field 1014 can indicate whether a term can be used for recognition of aviation communications, generation of aviation communications, or both recognition and generation of aviation communications. For example, FIG. 10B shows that "Word 1" can be used for "Recognition" of aviation communications, "Tag 1" is not used for either recognition or generation of aviation communications, "Phrase 1" can be used for "Generation" of aviation communications, and "Template 1" can be used for "All"—that is, for both recognition and generation of aviation communications.

To recognize (or generate) communications, communication repository 1010 can be queried for all terms that can be used for either "All" recognition and generation or for "Recognition" ("Generation") of aviation communications—selecting terms based on Recognize/generate field 1014 can reduce a number of terms used in, and so simplify and speed recognition (generation) of aviation communications.

In some embodiments, a communication repository can include information about how terms relate with each other. For example, a term FL related to a flight level, which is a specification of vertical altitude expressed in hundreds of feet, can be associated with one or more terms NUMS related to numbers. In this example, the communication repository can store information about the relationship between the term FL related to a flight level and the terms NUMS related to numbers. Further, the communication repository can store other information about how terms relate with each other.

FIG. 10C shows communication repository 1020 formatted to include term field 1022 and related term field 1024. That is, each row of communication repository 1020 can represent one communication component. In this example, the communication component includes a term in term field 1022 and one communication component in related term field 1024. Term field 1022 can specify a term related to aviation communications, such as term 1002 discussed herein in the context of FIG. 10A.

Related term field 1024 can be used to specify one or more terms that can be associated with the term specified in corresponding term field 1022. For example, suppose that "Word 1" is a number; e.g., "four". Then, as the number "four" is not necessarily related to any other terms, a related term field 1024 for "Word 1" could be "None" as shown in FIG. 10C. As an example related to "Tag 1", suppose that "Tag 1" is the <LorR> tag mentioned above; then "Word 17" shown as a related term to "Tag 1" in FIG. 10C, can be the word "left" (or the word "right"). In some embodiments, related term field 1024 can refer to multiple related terms; e.g., in this example of the <LorR> tag, suppose that "Word 17" is "left" and "Word 18" is "right"; then, a related term field for "Tag 1" could include references to both "Word 17" and "Word 18".

As another example, suppose "Phrase 1" is the group of words "requesting permission" and "Phrase 73" is the group of words "to take off". Then, by relating Phrase 1 and Phrase 73, a communication can be generated and/or recognized that includes the two groups of words "requesting permission to take off". Also, suppose that "Template 1" is "Climbing to <NumericAltitudeFt>", where a <NumericAltitudeFt> represents a numerical value for an altitude expressed in feet; e.g., "two thousand" for an altitude of two thousand feet, and "Tag 42" shown in related term field 1024 can refer to the <NumericAltitudeFt> tag. Many other examples of related terms are possible as well.

In some embodiments, a communication repository can include information about relationships between terms and airspace classifications. For example, a term FL related to a flight level can be a term often used in class A airspaces. In this example, the communication repository can store information indicating that term FL can be used when an aircraft is in class A airspace and/or otherwise be related to class A airspace. Further, the communication repository can store other information about relationships between terms and airspace classifications.

FIG. 10D shows communication repository 1030 formatted to include term field 1032 and classes field 1034. That is, each row of communication repository 1030 can represent one communication component. In this example, the communication component includes a term in term field 1030 and one communication component in classes field 1034. Term field 1032 can specify a term related to aviation communications, such as term 1002 discussed herein in the context of FIG. 10A. Classes field 1034 can specify one or more airspace classifications related to a term. For example, FIG. 10D shows an example that a word "Word 1" is associated a "Common" airspace classification; that is, Word 1 is associated with all airspace classifications. For example, Word 1 can be a word related to: a number, the military alphabet (e.g., Alpha, Bravo, Charlie . . . Zulu), weather/meteorological conditions, routes, times, courses, headings, other types of airspaces (e.g., restricted, controlled), vectors, navigational and/or other flight-related equipment, distances, and units of measure. Many other words, tags, phrases, and templates are possible related to all airspace classifications are possible as well. FIG. 10D shows an example tag "Tag 1" that is associated with class "B", "C", and "D" airspaces in communication repository 1030; for example, the tag "<ControlEntities>" associated with a rule of "Tower OR Control Tower OR Center OR Ground OR Ground Control OR ATC OR Approach OR Departure", which are names of air traffic and ground control entities controlling air and ground transportation in B, C, and D airspaces.

FIG. 10D shows a phrase "Phrase 1" that is associated with class "A" airspace in communication repository 1030; e.g., "Phrase 1" can be "standard pressure" which refers to the standard barometric pressure setting for an altimeter of 29.92 inches that is use for all altimeters in class A airspace. FIG. 10D also shows an example that a template "Template 1" is associated with class "G" airspace. For instance, Template 1 can be a template such as "<AirportName> UNICOM", where <AirportName> is a tag representing a name of an airport, and where UNICOM represents a universal communication channel at an uncontrolled airport in class G airspace.

One communication repository can store multiple types of information about terms, including, but not limited to, information about how terms in the communication repository can be used for automated communications, information about how terms relate with each other, and information about relationships between terms and airspace classifications. In some embodiments, each term in the communication repository can have a unique identifier—then a term can be expressly identified by and referred to using the unique identifier.

FIG. 10E shows communication repository 1040 formatted to include identifier (ID) field 1042, term field 1044, recognize/generate field (R/G) 1046, classes field 1048, and related term identifier field 1050. That is, each row of communication repository 1040 can represent one communication component. In this example, the communication component includes a term in term field 1042 and four communication components in term field 1044, recognize/generate field (R/G) 1046, classes field 1048, and related term identifier field 1050.

Identifier (ID) field 1042 can be a numerical, alphanumerical, or other value specifying a communication component in communication repository 1040. For example, ID "767" can be used to uniquely identify a communication component for "Phrase 1". Term field 1044 can specify a term related to aviation communications, such as term 1002 discussed herein in the context of FIG. 10A.

Recognition/generation field 1046 can specify whether a term can be used for generation of aviation communications, recognition of aviation communications, both recognition and generation of aviation communications, or neither recognition nor generation of aviation communications, such as discussed herein in the context of FIG. 10B. Classes field 1048 can specify one or more airspace classifications/classes associated with a term, such as discussed herein in the context of FIG. 10D. Related term identifier field 1050 can specify one or more identifiers related to a term; for example, FIG. 10E shows that term identified with identifier "135", which is the "Tag 1" term, is associated with a term whose identifier is "17". Relationships between terms are also discussed herein in the context of FIG. 10C. Other specifications for communication repositories than those illustrated by FIGS. 10A-10E are possible as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A computer-implemented method comprising:
receiving (i) position information for an unmanned aerial vehicle, and (ii) audio data encoding one or more aviation communications;
determining an airspace classification based on the position information for the unmanned aerial vehicle;
obtaining, by an automated speech recognizer, a transcription of the audio data based at least on the airspace classification; and
providing the transcription of the audio data for processing by the unmanned aerial vehicle.

2. The method of claim 1, wherein the one or more aviation communications are directed to the unmanned aerial vehicle.

3. The method of claim 1, wherein the position information for the unmanned aerial vehicle comprises an altitude of the unmanned aerial vehicle.

4. The method of claim 1, wherein the position information for the unmanned aerial vehicle comprises GPS coordinates for the unmanned aerial vehicle.

5. The method of claim 1, wherein obtaining the transcription of the audio data based at least on the airspace classification comprises:
selecting one or more topics of communication associated with the airspace classification.

6. The method of claim 1, wherein obtaining the transcription of the audio data based at least on the airspace classification comprises:
limiting a vocabulary associated with the automated speech recognizer based at least on the airspace classification.

7. The method of claim 6, wherein limiting the vocabulary comprises selecting a subset of communication data from among a universal set of possible communication data.

8. The method of claim 1, wherein obtaining the transcription of the audio data based at least on the airspace classification comprises:
selecting a subset of a universal set of communications data based at least on the airspace classification.

9. The method of claim 1, wherein the automated speech recognizer comprises speech recognition software.

10. A system comprising:
a processor configured to execute computer program instructions; and
a computer storage medium encoded with the computer program instructions that, when executed by the processor, cause the system to perform operations comprising:
receiving (i) position information for an unmanned aerial vehicle, and (ii) audio data encoding one or more aviation communications;
determining an airspace classification based on the position information for the unmanned aerial vehicle;
obtaining, by an automated speech recognizer, a transcription of the audio data based at least on the airspace classification; and
providing the transcription of the audio data for processing by the unmanned aerial vehicle.

11. The system of claim 10, wherein the one or more aviation communications are directed to the unmanned aerial vehicle.

12. The system of claim 10, wherein the position information for the unmanned aerial vehicle comprises an altitude of the unmanned aerial vehicle.

13. The system of claim 10, wherein the position information for the unmanned aerial vehicle comprises GPS coordinates for the unmanned aerial vehicle.

14. The system of claim 10, wherein obtaining the transcription of the audio data based at least on the airspace classification comprises:
selecting one or more topics of communication associated with the airspace classification.

15. The system of claim 10, wherein obtaining the transcription of the audio data based at least on the airspace classification comprises:
limiting a vocabulary associated with the automated speech recognizer based at least on the airspace classification.

16. The system of claim 10, wherein obtaining the transcription of the audio data based at least on the airspace classification comprises:
selecting a subset of a universal set of communications data based at least on the airspace classification.

17. A non-transitory computer-readable storage device encoded with a computer program, the computer program comprising instructions that, when executed by one or more computers, cause the one or more computers to perform operations comprising:

receiving (i) position information for an unmanned aerial vehicle, and (ii) audio data encoding one or more aviation communications;

determining an airspace classification based on the position information for the unmanned aerial vehicle;

obtaining, by an automated speech recognizer, a transcription of the audio data based at least on the airspace classification; and providing the transcription of the audio data for processing by the unmanned aerial vehicle.

18. The device of claim 17, wherein the one or more aviation communications are directed to the unmanned aerial vehicle.

19. The device of claim 17, wherein the position information for the unmanned aerial vehicle comprises an altitude of the unmanned aerial vehicle.

20. The device of claim 17, wherein the position information for the unmanned aerial vehicle comprises GPS coordinates for the unmanned aerial vehicle.

* * * * *